US010440627B2

(12) United States Patent
Malatack

(10) Patent No.: US 10,440,627 B2
(45) Date of Patent: *Oct. 8, 2019

(54) SYSTEM AND METHOD FOR ENABLING MULTI-MODAL COMMUNICATION

(71) Applicant: Twilio, Inc., San Francisco, CA (US)

(72) Inventor: Patrick Malatack, San Francisco, CA (US)

(73) Assignee: Twilio Inc., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/871,833

(22) Filed: Jan. 15, 2018

(65) Prior Publication Data
US 2018/0139677 A1 May 17, 2018

Related U.S. Application Data

(63) Continuation of application No. 14/944,869, filed on Nov. 18, 2015, now Pat. No. 9,907,010, which is a
(Continued)

(51) Int. Cl.
H04W 40/02 (2009.01)
H04W 60/00 (2009.01)
(Continued)

(52) U.S. Cl.
CPC ......... H04W 40/02 (2013.01); H04L 41/5051 (2013.01); H04L 45/745 (2013.01);
(Continued)

(58) Field of Classification Search
None
See application file for complete search history.

(56) References Cited

U.S. PATENT DOCUMENTS 5,274,700 A 12/1993 Gechter et al.
5,526,416 A 6/1996 Dezonno et al.
(Continued)

FOREIGN PATENT DOCUMENTS

DE 1684587 3/1971
EP 0282126 9/1988
(Continued)

OTHER PUBLICATIONS

"Ethernet to Token ring Bridge"—Black Box Corporation, Oct. 1999 http://blackboxcanada.com/resource/files/productdetails/17044.pdf.
(Continued)

Primary Examiner — Hassan A Phillips
Assistant Examiner — Gautam Sharma
(74) Attorney, Agent, or Firm — Schwegman Lundberg & Woessner, P.A.

(57) ABSTRACT

Systems and methods for a multi-tenant communication platform. At a multi-tenant communication platform, and responsive to authentication of a communication request provided by an external system, a routing address record of the communication platform is determined that matches a communication destination of the communication request. The matching routing address record associates the communication destination with a plurality of external communication providers. At least one communication provider associated with the matching routing address record is selected, and a request to establish communication with the communication destination is provided to each selected communication provider. The communication request specifies the communication destination and account information.

20 Claims, 13 Drawing Sheets

Related U.S. Application Data continuation of application No. 14/690,252, filed on Apr. 17, 2015, now Pat. No. 9,226,217.

(60) Provisional application No. 61/980,749, filed on Apr. 17, 2014.

(51) Int. Cl.

| | | |
|---|---|---|
| *H04L 12/741* | (2013.01) | |
| *H04W 8/26* | (2009.01) | |
| *H04L 12/24* | (2006.01) | |
| *H04W 88/06* | (2009.01) | |
| *H04L 29/06* | (2006.01) | |

(52) U.S. Cl.
CPC ............. *H04W 8/26* (2013.01); *H04W 60/00* (2013.01); *H04W 60/005* (2013.01); *H04L 45/74* (2013.01); *H04L 63/08* (2013.01); *H04W 88/06* (2013.01)

(56) References Cited

U.S. PATENT DOCUMENTS

| | | |
|---|---|---|
| 5,581,608 A | 12/1996 | Jreij et al. |
| 5,598,457 A | 1/1997 | Foladare et al. |
| 5,633,914 A | 5/1997 | Rosa |
| 5,867,495 A | 2/1999 | Elliott et al. |
| 5,934,181 A | 8/1999 | Adamczewski |
| 5,978,465 A | 11/1999 | Corduroy et al. |
| 6,026,440 A | 2/2000 | Shrader et al. |
| 6,034,946 A | 3/2000 | Roginsky et al. |
| 6,094,681 A | 7/2000 | Shaffer et al. |
| 6,138,143 A | 10/2000 | Gigliotti et al. |
| 6,185,565 B1 | 2/2001 | Meubus et al. |
| 6,192,123 B1 | 2/2001 | Grunsted et al. |
| 6,206,564 B1 | 3/2001 | Adamczewski |
| 6,223,287 B1 | 4/2001 | Douglas et al. |
| 6,232,979 B1 | 5/2001 | Shochet |
| 6,269,336 B1 | 7/2001 | Ladd et al. |
| 6,317,137 B1 | 11/2001 | Rosasco |
| 6,363,065 B1 | 3/2002 | Thornton et al. |
| 6,373,836 B1 | 4/2002 | Deryugin et al. |
| 6,425,012 B1 | 7/2002 | Trovato et al. |
| 6,426,995 B1 | 7/2002 | Kim et al. |
| 6,430,175 B1 | 8/2002 | Echols et al. |
| 6,434,528 B1 | 8/2002 | Sanders |
| 6,442,159 B2 | 8/2002 | Josse et al. |
| 6,445,694 B1 | 9/2002 | Swartz |
| 6,445,776 B1 | 9/2002 | Shank et al. |
| 6,459,913 B2 | 10/2002 | Cloutier |
| 6,463,414 B1 | 10/2002 | Su et al. |
| 6,493,558 B1 | 12/2002 | Bernhart et al. |
| 6,496,500 B2 | 12/2002 | Nance et al. |
| 6,501,739 B1 | 12/2002 | Cohen |
| 6,501,832 B1 | 12/2002 | Saylor et al. |
| 6,507,875 B1 | 1/2003 | Mellen-Garnett et al. |
| 6,571,245 B2 | 5/2003 | Huang et al. |
| 6,574,216 B1 | 6/2003 | Farris et al. |
| 6,577,721 B1 | 6/2003 | Vainio et al. |
| 6,600,736 B1 | 6/2003 | Ball et al. |
| 6,606,596 B1 | 8/2003 | Zirngibl et al. |
| 6,614,783 B1 | 9/2003 | Sonesh et al. |
| 6,625,258 B1 | 9/2003 | Ram et al. |
| 6,625,576 B2 | 9/2003 | Kochanski et al. |
| 6,636,504 B1 | 10/2003 | Albers et al. |
| 6,662,231 B1 | 12/2003 | Drosset et al. |
| 6,704,785 B1 | 3/2004 | Koo et al. |
| 6,707,811 B2 | 3/2004 | Greenberg et al. |
| 6,707,889 B1 | 3/2004 | Saylor et al. |
| 6,707,899 B2 | 3/2004 | Saito et al. |
| 6,711,129 B1 | 3/2004 | Bauer et al. |
| 6,711,249 B2 | 3/2004 | Weissman et al. |
| 6,738,738 B2 | 5/2004 | Henton |
| 6,757,365 B1 | 6/2004 | Bogard |
| 6,765,997 B1 | 7/2004 | Zirngibl et al. |
| 6,768,788 B1 | 7/2004 | Langseth et al. |
| 6,771,955 B2 | 8/2004 | Imura et al. |
| 6,778,653 B1 | 8/2004 | Kallas et al. |
| 6,785,266 B2 | 8/2004 | Swartz |
| 6,788,768 B1 | 9/2004 | Saylor et al. |
| 6,792,086 B1 | 9/2004 | Saylor et al. |
| 6,792,093 B2 | 9/2004 | Barak et al. |
| 6,798,867 B1 | 9/2004 | Zirngibl et al. |
| 6,801,604 B2 | 10/2004 | Maes et al. |
| 6,807,529 B2 | 10/2004 | Johnson et al. |
| 6,807,574 B1 | 10/2004 | Partovi et al. |
| 6,819,667 B1 | 11/2004 | Brusilovsky et al. |
| 6,820,260 B1 | 11/2004 | Flockhart et al. |
| 6,829,334 B1 | 12/2004 | Zirngibl et al. |
| 6,831,966 B1 | 12/2004 | Tegan et al. |
| 6,834,265 B2 | 12/2004 | Balasuriya |
| 6,836,537 B1 | 12/2004 | Zirngibl et al. |
| 6,842,767 B1 | 1/2005 | Partovi et al. |
| 6,850,603 B1 | 2/2005 | Eberle et al. |
| 6,870,830 B1 | 3/2005 | Schuster et al. |
| 6,873,952 B1 | 3/2005 | Bailey et al. |
| 6,885,737 B1 | 4/2005 | Gao et al. |
| 6,874,084 B1 | 5/2005 | Dobner et al. |
| 6,888,929 B1 | 5/2005 | Saylor et al. |
| 6,892,064 B2 | 5/2005 | Qi et al. |
| 6,895,084 B1 | 5/2005 | Saylor et al. |
| 6,898,567 B2 | 5/2005 | Balasuriya |
| 6,912,581 B2 | 6/2005 | Johnson et al. |
| 6,922,411 B1 | 7/2005 | Taylor |
| 6,928,469 B1 | 8/2005 | Duursma et al. |
| 6,931,405 B2 | 8/2005 | El-Shimi et al. |
| 6,934,858 B2 | 8/2005 | Woodhill |
| 6,937,699 B1 | 8/2005 | Schuster et al. |
| 6,940,953 B1 | 9/2005 | Eberle et al. |
| 6,941,268 B2 | 9/2005 | Porter et al. |
| 6,947,417 B2 | 9/2005 | Laursen et al. |
| 6,947,727 B1 | 9/2005 | Brynielsson |
| 6,947,988 B1 | 9/2005 | Saleh |
| 6,961,330 B1 | 11/2005 | Cattan et al. |
| 6,964,012 B1 | 11/2005 | Zirngibl et al. |
| 6,970,915 B1 | 11/2005 | Partovi et al. |
| 6,977,992 B2 | 12/2005 | Zirngibl et al. |
| 6,981,041 B2 | 12/2005 | Araujo et al. |
| 6,985,862 B2 | 1/2006 | Stroem et al. |
| 6,993,658 B1 | 1/2006 | Engberg et al. |
| 6,999,576 B2 | 2/2006 | Sacra |
| 7,003,464 B2 | 2/2006 | Ferrans et al. |
| 7,006,606 B1 | 2/2006 | Cohen et al. |
| 7,010,586 B1 | 3/2006 | Allavarpu et al. |
| 7,020,685 B1 | 3/2006 | Chen et al. |
| 7,039,165 B1 | 5/2006 | Saylor et al. |
| 7,046,778 B2 | 5/2006 | Martin et al. |
| 7,058,042 B2 | 6/2006 | Bontempi et al. |
| 7,058,181 B2 | 6/2006 | Wright et al. |
| 7,062,709 B2 | 6/2006 | Cheung |
| 7,065,637 B1 | 6/2006 | Nanja |
| 7,076,037 B1 | 7/2006 | Gonen et al. |
| 7,076,428 B2 | 7/2006 | Anastasakos et al. |
| 7,080,049 B2 | 7/2006 | Truitt et al. |
| 7,085,727 B2 | 8/2006 | Vanorman |
| 7,089,310 B1 | 8/2006 | Ellerman et al. |
| 7,092,370 B2 | 8/2006 | Jiang et al. |
| 7,099,442 B2 | 8/2006 | Da Palma et al. |
| 7,103,003 B2 | 9/2006 | Brueckheimer et al. |
| 7,103,171 B1 | 9/2006 | Annadata et al. |
| 7,106,844 B1 | 9/2006 | Holland |
| 7,110,513 B2 | 9/2006 | Halpern et al. |
| 7,110,514 B2 | 9/2006 | Brown et al. |
| 7,111,163 B1 | 9/2006 | Haney |
| 7,136,932 B1 | 11/2006 | Schneider |
| 7,140,004 B1 | 11/2006 | Kunins et al. |
| 7,142,662 B2 | 11/2006 | Rodenbusch et al. |
| 7,143,039 B1 | 11/2006 | Stifelman et al. |
| 7,197,331 B2 | 3/2007 | Anastasakos et al. |
| 7,197,461 B1 | 3/2007 | Eberle et al. |
| 7,197,462 B2 | 3/2007 | Takagi et al. |
| 7,197,544 B2 | 3/2007 | Wang et al. |
| D540,074 S | 4/2007 | Peters |
| 7,225,232 B2 | 5/2007 | Elberse |

(56) References Cited

U.S. PATENT DOCUMENTS

| | | |
|---|---|---|
| 7,227,849 B1 | 6/2007 | Rasanen |
| 7,231,035 B2 | 6/2007 | Walker et al. |
| 7,245,611 B2 | 7/2007 | Narasimhan et al. |
| 7,260,208 B2 | 8/2007 | Cavalcanti |
| 7,266,181 B1 | 9/2007 | Zirngibl et al. |
| 7,269,557 B1 | 9/2007 | Bailey et al. |
| 7,272,212 B2 | 9/2007 | Eberle et al. |
| 7,272,564 B2 | 9/2007 | Phillips et al. |
| 7,277,851 B1 | 10/2007 | Henton |
| 7,283,515 B2 | 10/2007 | Fowler |
| 7,283,519 B2 | 10/2007 | Girard |
| 7,286,521 B1 | 10/2007 | Jackson et al. |
| 7,287,248 B1 | 10/2007 | Adeeb |
| 7,289,453 B2 | 10/2007 | Riedel et al. |
| 7,296,739 B1 | 11/2007 | Mo et al. |
| 7,298,732 B2 | 11/2007 | Cho |
| 7,298,830 B2 | 11/2007 | Guedalia et al. |
| 7,298,834 B1 | 11/2007 | Homeier et al. |
| 7,308,085 B2 | 12/2007 | Weissman |
| 7,308,408 B1 | 12/2007 | Stifelman et al. |
| 7,324,633 B2 | 1/2008 | Gao et al. |
| 7,324,942 B1 | 1/2008 | Mahowald et al. |
| 7,328,263 B1 | 2/2008 | Sadjadi |
| 7,330,463 B1 | 2/2008 | Bradd et al. |
| 7,330,890 B1 | 2/2008 | Partovi et al. |
| 7,340,040 B1 | 3/2008 | Saylor et al. |
| 7,349,714 B2 | 3/2008 | Lee et al. |
| 7,369,865 B2 | 5/2008 | Gabriel et al. |
| 7,370,329 B2 | 5/2008 | Kumar et al. |
| 7,373,660 B1 | 5/2008 | Guichard et al. |
| 7,376,223 B2 | 5/2008 | Taylor et al. |
| 7,376,586 B1 | 5/2008 | Partovi et al. |
| 7,376,733 B2 | 5/2008 | Connelly et al. |
| 7,376,740 B1 | 5/2008 | Porter et al. |
| 7,383,572 B2 | 6/2008 | Rolfe |
| 7,395,050 B2 | 7/2008 | Tuomi et al. |
| 7,412,525 B2 | 8/2008 | Cafarella et al. |
| 7,418,090 B2 | 8/2008 | Reding et al. |
| 7,426,750 B2 | 9/2008 | Cooper et al. |
| 7,428,302 B2 | 9/2008 | Zirngibl et al. |
| 7,431,202 B1 | 10/2008 | Meador et al. |
| 7,440,898 B1 | 10/2008 | Eberle et al. |
| 7,447,299 B1 | 11/2008 | Partovi et al. |
| 7,454,459 B1 | 11/2008 | Kapoor et al. |
| 7,457,249 B2 | 11/2008 | Baldwin et al. |
| 7,457,397 B1 | 11/2008 | Saylor et al. |
| 7,473,872 B2 | 1/2009 | Takimoto |
| 7,486,780 B2 | 2/2009 | Zirngibl et al. |
| 7,496,054 B2 | 2/2009 | Taylor |
| 7,496,188 B2 | 2/2009 | Saha et al. |
| 7,496,651 B1 | 2/2009 | Joshi |
| 7,500,249 B2 | 3/2009 | Kampe et al. |
| 7,505,951 B2 | 3/2009 | Thompson et al. |
| 7,519,359 B2 | 4/2009 | Chiarulli et al. |
| 7,522,711 B1 | 4/2009 | Stein et al. |
| 7,536,454 B2 | 5/2009 | Balasuriya |
| 7,542,761 B2 | 6/2009 | Sarkar |
| 7,552,054 B1 | 6/2009 | Stifelman et al. |
| 7,565,547 B2 | 7/2009 | Matta et al. |
| 7,571,226 B1 | 8/2009 | Partovi et al. |
| 7,577,847 B2 | 8/2009 | Nguyen et al. |
| 7,606,868 B1 | 10/2009 | Le et al. |
| 7,613,287 B1 | 11/2009 | Stifelman et al. |
| 7,623,648 B1 | 11/2009 | Oppenheim et al. |
| 7,630,900 B1 | 12/2009 | Strom |
| 7,631,310 B1 | 12/2009 | Henzinger |
| 7,644,000 B1 | 1/2010 | Strom |
| 7,657,433 B1 | 2/2010 | Chang |
| 7,657,434 B2 | 2/2010 | Thompson et al. |
| 7,668,157 B2 | 2/2010 | Weintraub et al. |
| 7,672,275 B2 | 3/2010 | Yajnik et al. |
| 7,672,295 B1 | 3/2010 | Andhare et al. |
| 7,675,857 B1 | 3/2010 | Chesson |
| 7,676,221 B2 | 3/2010 | Roundtree et al. |
| 7,685,280 B2 | 3/2010 | Berry et al. |
| 7,685,298 B2 | 3/2010 | Day et al. |
| 7,715,547 B2 | 5/2010 | Ibbotson et al. |
| 7,716,293 B2 | 5/2010 | Kasuga et al. |
| 7,742,499 B1 | 6/2010 | Erskine et al. |
| 7,756,507 B2 | 7/2010 | Morper et al. |
| 7,764,955 B1 | 7/2010 | Mangal et al. |
| 7,779,065 B2 | 8/2010 | Gupta et al. |
| 7,809,125 B2 | 10/2010 | Brunson et al. |
| 7,809,791 B2 | 10/2010 | Schwartz et al. |
| 7,875,836 B2 | 1/2011 | Imura et al. |
| 7,882,253 B2 | 2/2011 | Pardo-Castellote et al. |
| 7,920,866 B2 | 4/2011 | Bosch et al. |
| 7,926,099 B1 | 4/2011 | Chakravarty et al. |
| 7,929,562 B2 | 4/2011 | Petrovykh |
| 7,936,867 B1 | 5/2011 | Hill et al. |
| 7,946,913 B2 | 5/2011 | Yacenda |
| 7,949,111 B2 | 5/2011 | Harlow et al. |
| 7,962,644 B1 | 6/2011 | Ezerzer et al. |
| 7,979,555 B2 | 7/2011 | Rothstein et al. |
| 7,983,404 B1 | 7/2011 | Croak et al. |
| 7,992,120 B1 | 8/2011 | Wang et al. |
| 8,023,425 B2 | 9/2011 | Raleigh |
| 8,024,567 B2 | 9/2011 | Han |
| 8,024,785 B2 | 9/2011 | Andress |
| 8,045,689 B2 | 10/2011 | Provenzale et al. |
| 8,046,378 B1 | 10/2011 | Zhuge et al. |
| 8,046,823 B1 | 10/2011 | Begen et al. |
| 8,069,096 B1 | 11/2011 | Ballaro et al. |
| 8,078,483 B1 | 12/2011 | Hirose et al. |
| 8,081,744 B2 | 12/2011 | Sylvain |
| 8,081,958 B2 | 12/2011 | Soederstroem et al. |
| 8,082,576 B2 | 12/2011 | Flynn et al. |
| 8,103,725 B2 | 1/2012 | Gupta et al. |
| 8,126,128 B1 | 2/2012 | Hicks, III et al. |
| 8,126,129 B1 | 2/2012 | McGuire |
| 8,130,750 B2 | 3/2012 | Hester |
| 8,130,917 B2 | 3/2012 | Helbling et al. |
| 8,139,730 B2 | 3/2012 | Palma et al. |
| 8,145,212 B2 | 3/2012 | Lopresti et al. |
| 8,149,716 B2 | 4/2012 | Ramanathan et al. |
| 8,150,918 B1 | 4/2012 | Edelman et al. |
| 8,156,213 B1 | 4/2012 | Deng et al. |
| 8,165,116 B2 | 4/2012 | Ku et al. |
| 8,166,185 B2 | 4/2012 | Samuel et al. |
| 8,166,299 B2 | 4/2012 | Kemshall |
| 8,169,936 B2 | 5/2012 | Koren et al. |
| 8,175,007 B2 | 5/2012 | Jain et al. |
| 8,185,619 B1 | 5/2012 | Maiocco et al. |
| 8,190,670 B2 | 5/2012 | Gavrilescu et al. |
| 8,196,133 B2 | 6/2012 | Kakumani et al. |
| 8,204,479 B2 | 6/2012 | Vendrow et al. |
| 8,214,868 B2 | 7/2012 | Hamilton et al. |
| 8,218,457 B2 | 7/2012 | Malhotra et al. |
| 8,233,611 B1 | 7/2012 | Zettner |
| 8,238,533 B2 | 8/2012 | Blackwell et al. |
| 8,243,889 B2 | 8/2012 | Taylor et al. |
| 8,244,822 B1 | 8/2012 | Lowry et al. |
| 8,249,552 B1 | 8/2012 | Gailloux et al. |
| 8,266,327 B2 | 9/2012 | Kumar et al. |
| 8,295,272 B2 | 10/2012 | Boni et al. |
| 8,301,117 B2 | 10/2012 | Keast et al. |
| 8,302,175 B2 | 10/2012 | Thoursie et al. |
| 8,306,021 B2 | 11/2012 | Lawson et al. |
| 8,315,198 B2 | 11/2012 | Corneille et al. |
| 8,315,369 B2 | 11/2012 | Lawson et al. |
| 8,315,620 B1 | 11/2012 | Williamson et al. |
| 8,319,816 B1 | 11/2012 | Swanson et al. |
| 8,326,805 B1 | 12/2012 | Arous et al. |
| 8,335,852 B2 | 12/2012 | Hokimoto |
| 8,346,630 B1 | 1/2013 | McKeown |
| 8,355,394 B2 | 1/2013 | Taylor et al. |
| 8,411,669 B2 | 4/2013 | Chen et al. |
| 8,413,247 B2 | 4/2013 | Hudis et al. |
| 8,416,923 B2 | 4/2013 | Lawson et al. |
| 8,417,817 B1 | 4/2013 | Jacobs |
| 8,429,827 B1 | 4/2013 | Wetzel |
| 8,438,315 B1 | 5/2013 | Tao et al. |
| 8,447,025 B2 | 5/2013 | Shaffer et al. |
| 8,462,670 B2 | 6/2013 | Chien et al. |

(56) References Cited

U.S. PATENT DOCUMENTS

| | | |
|---|---|---|
| 8,462,920 B2 | 6/2013 | Gonen et al. |
| 8,467,502 B2 | 6/2013 | Sureka et al. |
| 8,477,926 B2 | 7/2013 | Jasper et al. |
| 8,503,639 B2 | 8/2013 | Reding et al. |
| 8,503,650 B2 | 8/2013 | Reding et al. |
| 8,504,818 B2 | 8/2013 | Rao et al. |
| 8,509,068 B2 | 8/2013 | Begall et al. |
| 8,532,686 B2 | 9/2013 | Schmidt et al. |
| 8,533,857 B2 | 9/2013 | Tuchman et al. |
| 8,542,805 B2 | 9/2013 | Agranovsky et al. |
| 8,543,665 B2 | 9/2013 | Ansari et al. |
| 8,547,962 B2 | 10/2013 | Ramachandran et al. |
| 8,549,047 B2 | 10/2013 | Beechuk et al. |
| 8,565,117 B2 | 10/2013 | Hilt et al. |
| 8,572,391 B2 | 10/2013 | Golan et al. |
| 8,576,712 B2 | 11/2013 | Sabat et al. |
| 8,577,803 B2 | 11/2013 | Chatterjee et al. |
| 8,582,450 B1 | 11/2013 | Robesky |
| 8,582,737 B2 | 11/2013 | Lawson et al. |
| 8,594,626 B1 | 11/2013 | Woodson et al. |
| 8,601,136 B1 | 12/2013 | Fahlgren et al. |
| 8,611,338 B2 | 12/2013 | Lawson et al. |
| 8,613,102 B2 | 12/2013 | Nath |
| 8,621,598 B2 | 12/2013 | Lai et al. |
| 8,649,268 B2 | 2/2014 | Lawson et al. |
| 8,656,452 B2 | 2/2014 | Li et al. |
| 8,667,056 B1 | 3/2014 | Proulx et al. |
| 8,675,493 B2 | 3/2014 | Buddhikot et al. |
| 8,688,147 B2 | 4/2014 | Nguyen et al. |
| 8,694,025 B2 | 4/2014 | Dupray et al. |
| 8,695,077 B1 | 4/2014 | Gerhard et al. |
| 8,713,693 B2 | 4/2014 | Shanabrook et al. |
| 8,728,656 B2 | 5/2014 | Takahashi et al. |
| 8,737,593 B2 | 5/2014 | Lawson et al. |
| 8,737,962 B2 | 5/2014 | Ballai et al. |
| 8,738,051 B2 | 5/2014 | Nowack et al. |
| 8,745,205 B2 | 6/2014 | Anderson et al. |
| 8,751,801 B2 | 6/2014 | Harris et al. |
| 8,755,376 B2 | 6/2014 | Lawson et al. |
| 8,767,925 B2 | 7/2014 | Sureka et al. |
| 8,781,975 B2 | 7/2014 | Bennett et al. |
| 8,797,920 B2 | 8/2014 | Parreira |
| 8,806,024 B1 | 8/2014 | Francis et al. |
| 8,819,133 B2 | 8/2014 | Wang |
| 8,825,746 B2 | 9/2014 | Ravichandran |
| 8,837,465 B2 | 9/2014 | Lawson et al. |
| 8,838,707 B2 | 9/2014 | Lawson et al. |
| 8,843,596 B2 | 9/2014 | Goel et al. |
| 8,855,271 B2 | 10/2014 | Brock |
| 8,861,510 B1 | 10/2014 | Fritz |
| 8,879,547 B2 | 11/2014 | Maes |
| 8,903,938 B2 | 12/2014 | Vermeulen et al. |
| 8,918,848 B2 | 12/2014 | Sharma et al. |
| 8,924,489 B2 | 12/2014 | Bleau et al. |
| 8,938,053 B2 | 1/2015 | Cooke et al. |
| 8,948,356 B2 | 2/2015 | Nowack et al. |
| 8,954,591 B2 | 2/2015 | Ganesan et al. |
| 8,964,726 B2 | 2/2015 | Lawson et al. |
| 8,990,610 B2 | 3/2015 | Bostick et al. |
| 9,014,664 B2 | 4/2015 | Kim et al. |
| 9,015,702 B2 | 4/2015 | Bhat |
| 9,031,223 B2 | 5/2015 | Smith et al. |
| 9,032,204 B2 | 5/2015 | Byrd et al. |
| 9,071,677 B2 | 6/2015 | Aggarwal et al. |
| 9,137,127 B2 | 9/2015 | Nowack |
| 9,141,682 B1 | 9/2015 | Adoc, Jr. et al. |
| 9,160,696 B2 | 10/2015 | Wilsher et al. |
| 9,161,296 B2 | 10/2015 | Parsons et al. |
| 9,177,007 B2 | 11/2015 | Winters et al. |
| 9,204,281 B2 | 12/2015 | Ramprasad et al. |
| 9,210,275 B2 | 12/2015 | Lawson et al. |
| 9,225,840 B2 | 12/2015 | Malatack et al. |
| 9,226,217 B2 | 12/2015 | Malatack |
| 9,270,833 B2 | 2/2016 | Ballai et al. |
| 9,306,982 B2 | 4/2016 | Lawson et al. |
| 9,307,094 B2 | 4/2016 | Nowack et al. |
| 9,325,624 B2 | 4/2016 | Malatack et al. |
| 9,338,190 B2 | 5/2016 | Eng et al. |
| 9,344,573 B2 | 5/2016 | Wolthuis |
| 9,356,916 B2 | 5/2016 | Kravitz et al. |
| 9,378,337 B2 | 6/2016 | Kuhr |
| 9,398,622 B2 | 7/2016 | Lawson et al. |
| 9,456,008 B2 | 9/2016 | Lawson et al. |
| 9,456,339 B1 | 9/2016 | Hildner et al. |
| 9,460,169 B2 | 10/2016 | Hinton et al. |
| 9,596,274 B2 | 3/2017 | Lawson et al. |
| 9,628,624 B2 | 4/2017 | Wolthuis et al. |
| 9,632,875 B2 | 4/2017 | Raichstein et al. |
| 9,634,995 B2 | 4/2017 | Binder |
| 9,907,010 B2 | 2/2018 | Malatack |
| 2001/0032192 A1 | 10/2001 | Putta et al. |
| 2001/0037254 A1 | 11/2001 | Glikman |
| 2001/0037264 A1 | 11/2001 | Husemann et al. |
| 2001/0038624 A1 | 11/2001 | Greenberg et al. |
| 2001/0043684 A1 | 11/2001 | Guedalia et al. |
| 2001/0051996 A1 | 12/2001 | Cooper et al. |
| 2002/0006124 A1 | 1/2002 | Jimenez et al. |
| 2002/0006125 A1 | 1/2002 | Josse et al. |
| 2002/0006193 A1 | 1/2002 | Rodenbusch et al. |
| 2002/0020741 A1 | 2/2002 | Sakaguchi |
| 2002/0025819 A1 | 2/2002 | Cetusic et al. |
| 2002/0032874 A1 | 3/2002 | Hagen et al. |
| 2002/0035539 A1 | 3/2002 | O'Connell |
| 2002/0057777 A1 | 5/2002 | Saito et al. |
| 2002/0064267 A1 | 5/2002 | Martin et al. |
| 2002/0067823 A1 | 6/2002 | Walker et al. |
| 2002/0070273 A1 | 6/2002 | Fujll |
| 2002/0077833 A1 | 6/2002 | Arons et al. |
| 2002/0126813 A1 | 9/2002 | Partovi et al. |
| 2002/0133587 A1 | 9/2002 | Ensel et al. |
| 2002/0136391 A1 | 9/2002 | Armstrong |
| 2002/0138450 A1 | 9/2002 | Kremer |
| 2002/0147913 A1 | 10/2002 | Lun Yip |
| 2002/0165957 A1 | 11/2002 | Devoe et al. |
| 2002/0169988 A1 | 11/2002 | Vandergeest et al. |
| 2002/0176378 A1 | 11/2002 | Hamilton et al. |
| 2002/0176404 A1 | 11/2002 | Girard |
| 2002/0177433 A1 | 11/2002 | Bravo et al. |
| 2002/0184361 A1 | 12/2002 | Eden |
| 2002/0198941 A1 | 12/2002 | Gavrilescu et al. |
| 2003/0005136 A1 | 1/2003 | Eun |
| 2003/0006137 A1 | 1/2003 | Wei et al. |
| 2003/0012356 A1 | 1/2003 | Zino et al. |
| 2003/0014665 A1 | 1/2003 | Anderson et al. |
| 2003/0018830 A1 | 1/2003 | Chen et al. |
| 2003/0023672 A1 | 1/2003 | Vaysman |
| 2003/0026426 A1 | 2/2003 | Wright |
| 2003/0046366 A1 | 3/2003 | Pardikar et al. |
| 2003/0051037 A1 | 3/2003 | Sundaram et al. |
| 2003/0058884 A1 | 3/2003 | Kallner et al. |
| 2003/0059020 A1 | 3/2003 | Meyerson et al. |
| 2003/0060188 A1 | 3/2003 | Gidron et al. |
| 2003/0061317 A1 | 3/2003 | Brown et al. |
| 2003/0061404 A1 | 3/2003 | Atwal |
| 2003/0088421 A1 | 5/2003 | Maes et al. |
| 2003/0097330 A1 | 5/2003 | Hillmer et al. |
| 2003/0097447 A1 | 5/2003 | Johnston |
| 2003/0097639 A1 | 5/2003 | Niyogi et al. |
| 2003/0103620 A1 | 6/2003 | Brown et al. |
| 2003/0123640 A1 | 7/2003 | Roelle et al. |
| 2003/0126076 A1 | 7/2003 | Kwok et al. |
| 2003/0149721 A1 | 8/2003 | Alfonso-Nogueiro et al. |
| 2003/0159068 A1 | 8/2003 | Halpin et al. |
| 2003/0162506 A1 | 8/2003 | Toshimitsu et al. |
| 2003/0169881 A1 | 9/2003 | Niedermeyer |
| 2003/0172272 A1 | 9/2003 | Ehlers et al. |
| 2003/0195950 A1 | 10/2003 | Huang et al. |
| 2003/0195990 A1 | 10/2003 | Greenblat |
| 2003/0196076 A1 | 10/2003 | Zabarski et al. |
| 2003/0204616 A1 | 10/2003 | Billhartz et al. |
| 2003/0204756 A1 | 10/2003 | Ransom et al. |
| 2003/0211842 A1 | 11/2003 | Kempf et al. |
| 2003/0221125 A1 | 11/2003 | Rolfe |
| 2003/0231647 A1 | 12/2003 | Petrovykh |

(56) References Cited

U.S. PATENT DOCUMENTS

| | | |
|---|---|---|
| 2003/0233276 A1 | 12/2003 | Pearlman et al. |
| 2004/0008635 A1 | 1/2004 | Nelson et al. |
| 2004/0011690 A1 | 1/2004 | Marfino et al. |
| 2004/0044953 A1 | 3/2004 | Watkins et al. |
| 2004/0052349 A1 | 3/2004 | Creamer et al. |
| 2004/0054632 A1 | 3/2004 | Remy |
| 2004/0071275 A1 | 4/2004 | Bowater et al. |
| 2004/0073519 A1 | 4/2004 | Fast |
| 2004/0097217 A1 | 5/2004 | Mcclain |
| 2004/0101122 A1 | 5/2004 | Da Palma |
| 2004/0102182 A1 | 5/2004 | Reith et al. |
| 2004/0117788 A1 | 6/2004 | Karaoguz et al. |
| 2004/0122685 A1 | 6/2004 | Bunce |
| 2004/0136324 A1 | 7/2004 | Steinberg et al. |
| 2004/0165569 A1 | 8/2004 | Sweatman et al. |
| 2004/0172482 A1 | 9/2004 | Weissman et al. |
| 2004/0199572 A1 | 10/2004 | Hunt et al. |
| 2004/0203595 A1 | 10/2004 | Singhal |
| 2004/0205101 A1 | 10/2004 | Radhakrishnan |
| 2004/0205689 A1 | 10/2004 | Ellens et al. |
| 2004/0213400 A1 | 10/2004 | Golitsin et al. |
| 2004/0216058 A1 | 10/2004 | Chavers et al. |
| 2004/0218748 A1 | 11/2004 | Fisher |
| 2004/0219904 A1 | 11/2004 | De |
| 2004/0228469 A1 | 11/2004 | Andrews et al. |
| 2004/0236696 A1 | 11/2004 | Aoki et al. |
| 2004/0240649 A1 | 12/2004 | Goel |
| 2005/0005109 A1 | 1/2005 | Castaldi et al. |
| 2005/0005200 A1 | 1/2005 | Matena et al. |
| 2005/0010483 A1 | 1/2005 | Ling |
| 2005/0015505 A1 | 1/2005 | Kruis et al. |
| 2005/0021626 A1 | 1/2005 | Prajapat et al. |
| 2005/0025303 A1 | 2/2005 | Hostetler |
| 2005/0038772 A1 | 2/2005 | Colrain |
| 2005/0043952 A1 | 2/2005 | Sharma et al. |
| 2005/0047579 A1 | 3/2005 | Salame |
| 2005/0060411 A1 | 3/2005 | Coulombe et al. |
| 2005/0066179 A1 | 3/2005 | Seidlein |
| 2005/0083907 A1 | 4/2005 | Fishler |
| 2005/0091336 A1 | 4/2005 | DeHamer et al. |
| 2005/0091572 A1 | 4/2005 | Gavrilescu et al. |
| 2005/0108770 A1 | 5/2005 | Karaoguz et al. |
| 2005/0125251 A1 | 6/2005 | Berger et al. |
| 2005/0125739 A1 | 6/2005 | Thompson et al. |
| 2005/0128961 A1 | 6/2005 | Miloslavsky et al. |
| 2005/0135578 A1 | 6/2005 | Ress et al. |
| 2005/0141500 A1 | 6/2005 | Bhandari et al. |
| 2005/0147088 A1 | 7/2005 | Bao et al. |
| 2005/0176449 A1 | 8/2005 | Cui et al. |
| 2005/0177635 A1 | 8/2005 | Schmidt et al. |
| 2005/0181835 A1 | 8/2005 | Lau et al. |
| 2005/0198292 A1 | 9/2005 | Duursma et al. |
| 2005/0228680 A1 | 10/2005 | Malik |
| 2005/0238153 A1 | 10/2005 | Chevalier |
| 2005/0240659 A1 | 10/2005 | Taylor |
| 2005/0243977 A1 | 11/2005 | Creamer et al. |
| 2005/0246176 A1 | 11/2005 | Creamer et al. |
| 2005/0273442 A1 | 12/2005 | Bennett et al. |
| 2005/0286496 A1 | 12/2005 | Malhotra |
| 2005/0289222 A1 | 12/2005 | Sahim |
| 2006/0008065 A1 | 1/2006 | Longman et al. |
| 2006/0008073 A1 | 1/2006 | Yoshizawa et al. |
| 2006/0008256 A1 | 1/2006 | Khedouri et al. |
| 2006/0015467 A1 | 1/2006 | Morken et al. |
| 2006/0020799 A1 | 1/2006 | Kemshall |
| 2006/0021004 A1 | 1/2006 | Moran et al. |
| 2006/0023676 A1 | 2/2006 | Whitmore et al. |
| 2006/0047666 A1 | 3/2006 | Bedi et al. |
| 2006/0067506 A1 | 3/2006 | Flockhart et al. |
| 2006/0080415 A1 | 4/2006 | Tu |
| 2006/0098624 A1 | 5/2006 | Morgan et al. |
| 2006/0129638 A1 | 6/2006 | Deakin |
| 2006/0143007 A1 | 6/2006 | Koh et al. |
| 2006/0146792 A1 | 7/2006 | Ramachandran et al. |
| 2006/0146802 A1 | 7/2006 | Baldwin et al. |
| 2006/0168126 A1 | 7/2006 | Costa-Requena et al. |
| 2006/0168334 A1 | 7/2006 | Potti et al. |
| 2006/0203979 A1 | 9/2006 | Jennings |
| 2006/0209695 A1 | 9/2006 | Archer et al. |
| 2006/0212865 A1 | 9/2006 | Vincent et al. |
| 2006/0215824 A1 | 9/2006 | Mitby et al. |
| 2006/0217823 A1 | 9/2006 | Hussey |
| 2006/0217978 A1 | 9/2006 | Mitby et al. |
| 2006/0222166 A1 | 10/2006 | Ramakrishna et al. |
| 2006/0235715 A1 | 10/2006 | Abrams |
| 2006/0256816 A1 | 11/2006 | Yarlagadda et al. |
| 2006/0262915 A1 | 11/2006 | Marascio et al. |
| 2006/0270386 A1 | 11/2006 | Yu et al. |
| 2006/0285489 A1 | 12/2006 | Francisco et al. |
| 2007/0002744 A1 | 1/2007 | Mewhinney et al. |
| 2007/0027775 A1 | 2/2007 | Hwang |
| 2007/0036143 A1 | 2/2007 | Alt et al. |
| 2007/0038499 A1 | 2/2007 | Margulies et al. |
| 2007/0042755 A1 | 2/2007 | Singhal |
| 2007/0043681 A1 | 2/2007 | Morgan et al. |
| 2007/0050306 A1 | 3/2007 | McQueen |
| 2007/0064672 A1 | 3/2007 | Raghav et al. |
| 2007/0070906 A1 | 3/2007 | Thakur |
| 2007/0070980 A1 | 3/2007 | Phelps |
| 2007/0071223 A1 | 3/2007 | Lee et al. |
| 2007/0074174 A1 | 3/2007 | Thornton |
| 2007/0088836 A1 | 4/2007 | Tai et al. |
| 2007/0091907 A1 | 4/2007 | Seshadri et al. |
| 2007/0094095 A1 | 4/2007 | Kilby |
| 2007/0107048 A1 | 5/2007 | Halls et al. |
| 2007/0112574 A1 | 5/2007 | Greene |
| 2007/0112673 A1 | 5/2007 | Protti |
| 2007/0116191 A1 | 5/2007 | Bermudez et al. |
| 2007/0121651 A1 | 5/2007 | Casey et al. |
| 2007/0124536 A1 | 5/2007 | Carper |
| 2007/0127691 A1 | 6/2007 | Lert |
| 2007/0127703 A1 | 6/2007 | Siminoff |
| 2007/0130260 A1 | 6/2007 | Weintraub et al. |
| 2007/0133771 A1 | 6/2007 | Stifelman et al. |
| 2007/0147351 A1 | 6/2007 | Dietrich et al. |
| 2007/0149166 A1 | 6/2007 | Turcotte et al. |
| 2007/0153711 A1 | 7/2007 | Dykas et al. |
| 2007/0167170 A1 | 7/2007 | Fitchett et al. |
| 2007/0192629 A1 | 8/2007 | Saito |
| 2007/0201448 A1 | 8/2007 | Baird et al. |
| 2007/0208862 A1 | 9/2007 | Fox et al. |
| 2007/0232284 A1 | 10/2007 | Mason et al. |
| 2007/0239761 A1 | 10/2007 | Baio et al. |
| 2007/0242626 A1 | 10/2007 | Altberg et al. |
| 2007/0255828 A1 | 11/2007 | Paradise |
| 2007/0265073 A1 | 11/2007 | Novi et al. |
| 2007/0286180 A1 | 12/2007 | Marquette et al. |
| 2007/0291734 A1 | 12/2007 | Bhatia et al. |
| 2007/0291905 A1 | 12/2007 | Halliday et al. |
| 2007/0293200 A1 | 12/2007 | Roundtree et al. |
| 2007/0295803 A1 | 12/2007 | Levine et al. |
| 2008/0005275 A1 | 1/2008 | Overton et al. |
| 2008/0025320 A1 | 1/2008 | Bangalore et al. |
| 2008/0037715 A1 | 2/2008 | Prozeniuk et al. |
| 2008/0037746 A1 | 2/2008 | Dufrene et al. |
| 2008/0040484 A1 | 2/2008 | Yardley |
| 2008/0049617 A1 | 2/2008 | Grice et al. |
| 2008/0052395 A1 | 2/2008 | Wright et al. |
| 2008/0091843 A1 | 4/2008 | Kulkarni |
| 2008/0101571 A1 | 5/2008 | Harlow et al. |
| 2008/0104348 A1 | 5/2008 | Kabzinski et al. |
| 2008/0120702 A1 | 5/2008 | Holimoto |
| 2008/0123559 A1 | 5/2008 | Haviv et al. |
| 2008/0134049 A1 | 6/2008 | Gupta et al. |
| 2008/0139166 A1 | 6/2008 | Agarwal et al. |
| 2008/0146268 A1 | 6/2008 | Gandhi et al. |
| 2008/0152101 A1 | 6/2008 | Griggs |
| 2008/0154601 A1 | 6/2008 | Stifelman et al. |
| 2008/0155029 A1 | 6/2008 | Helbling |
| 2008/0162482 A1 | 7/2008 | Ahern et al. |
| 2008/0165708 A1 | 7/2008 | Moore et al. |
| 2008/0172404 A1 | 7/2008 | Cohen |
| 2008/0177883 A1 | 7/2008 | Hanai et al. |
| 2008/0192736 A1 | 8/2008 | Jabri et al. |

(56) References Cited

U.S. PATENT DOCUMENTS

| | | |
|---|---|---|
| 2008/0201426 A1 | 8/2008 | Darcie |
| 2008/0209050 A1 | 8/2008 | Li |
| 2008/0212945 A1 | 9/2008 | Khedouri et al. |
| 2008/0222656 A1 | 9/2008 | Lyman |
| 2008/0229421 A1 | 9/2008 | Hudis et al. |
| 2008/0232574 A1 | 9/2008 | Baluja et al. |
| 2008/0235230 A1 | 9/2008 | Maes |
| 2008/0256224 A1 | 10/2008 | Kaji et al. |
| 2008/0275741 A1 | 11/2008 | Loeffen |
| 2008/0307436 A1 | 12/2008 | Hamilton |
| 2008/0310599 A1 | 12/2008 | Purnadi et al. |
| 2008/0313318 A1 | 12/2008 | Vermeulen |
| 2008/0316931 A1 | 12/2008 | Qiu et al. |
| 2008/0317222 A1 | 12/2008 | Griggs et al. |
| 2008/0317232 A1 | 12/2008 | Couse et al. |
| 2008/0317233 A1 | 12/2008 | Rey et al. |
| 2009/0046838 A1 | 2/2009 | Andreasson |
| 2009/0052437 A1 | 2/2009 | Taylor et al. |
| 2009/0052641 A1 | 2/2009 | Taylor et al. |
| 2009/0059894 A1 | 3/2009 | Jackson et al. |
| 2009/0063502 A1 | 3/2009 | Coimbatore et al. |
| 2009/0074159 A1 | 3/2009 | Goldfarb et al. |
| 2009/0075684 A1 | 3/2009 | Cheng et al. |
| 2009/0083155 A1 | 3/2009 | Tudor et al. |
| 2009/0089165 A1 | 4/2009 | Sweeney |
| 2009/0089352 A1 | 4/2009 | Davis et al. |
| 2009/0089699 A1 | 4/2009 | Saha et al. |
| 2009/0092674 A1 | 4/2009 | Schwartz |
| 2009/0093250 A1 | 4/2009 | Jackson et al. |
| 2009/0094674 A1 | 4/2009 | Schwartz et al. |
| 2009/0106829 A1 | 4/2009 | Thoursie et al. |
| 2009/0125608 A1 | 5/2009 | Werth et al. |
| 2009/0129573 A1 | 5/2009 | Gavan et al. |
| 2009/0136011 A1 | 5/2009 | Goel |
| 2009/0170496 A1 | 7/2009 | Bourque |
| 2009/0171659 A1 | 7/2009 | Pearce et al. |
| 2009/0171669 A1 | 7/2009 | Engelsma et al. |
| 2009/0171752 A1 | 7/2009 | Galvin et al. |
| 2009/0182896 A1 | 7/2009 | Patterson et al. |
| 2009/0193433 A1 | 7/2009 | Maes |
| 2009/0216835 A1 | 8/2009 | Jain et al. |
| 2009/0217293 A1 | 8/2009 | Wolber et al. |
| 2009/0220057 A1 | 9/2009 | Waters |
| 2009/0221310 A1 | 9/2009 | Chen et al. |
| 2009/0222341 A1 | 9/2009 | Belwadi et al. |
| 2009/0225748 A1 | 9/2009 | Taylor |
| 2009/0225763 A1 | 9/2009 | Forsberg et al. |
| 2009/0228868 A1 | 9/2009 | Drukman et al. |
| 2009/0232289 A1 | 9/2009 | Drucker et al. |
| 2009/0234965 A1 | 9/2009 | Viveganandhan et al. |
| 2009/0235349 A1 | 9/2009 | Lai et al. |
| 2009/0241135 A1 | 9/2009 | Wong et al. |
| 2009/0252159 A1 | 10/2009 | Lawson et al. |
| 2009/0262725 A1 | 10/2009 | Chen |
| 2009/0276771 A1* | 11/2009 | Nickolov ............ G06F 9/4856 717/177 |
| 2009/0288012 A1 | 11/2009 | Udo et al. |
| 2009/0288165 A1 | 11/2009 | Qiu et al. |
| 2009/0300194 A1 | 12/2009 | Ogasawara |
| 2009/0316687 A1 | 12/2009 | Kruppa |
| 2009/0318112 A1 | 12/2009 | Vasten |
| 2010/0027531 A1 | 2/2010 | Kurashima |
| 2010/0037204 A1 | 2/2010 | Lin et al. |
| 2010/0054142 A1 | 3/2010 | Moiso et al. |
| 2010/0070424 A1 | 3/2010 | Monk |
| 2010/0071053 A1 | 3/2010 | Ansari et al. |
| 2010/0082513 A1 | 4/2010 | Liu |
| 2010/0087215 A1 | 4/2010 | Gu et al. |
| 2010/0088187 A1 | 4/2010 | Courtney et al. |
| 2010/0088698 A1 | 4/2010 | Krishnamurthy |
| 2010/0094758 A1 | 4/2010 | Chamberlain et al. |
| 2010/0103845 A1 | 4/2010 | Ulupinar et al. |
| 2010/0107222 A1 | 4/2010 | Glasser |
| 2010/0115041 A1 | 5/2010 | Hawkins et al. |
| 2010/0138501 A1 | 6/2010 | Clinton et al. |
| 2010/0142516 A1 | 6/2010 | Lawson et al. |
| 2010/0150139 A1 | 6/2010 | Lawson |
| 2010/0167689 A1 | 7/2010 | Sepehri-Nik et al. |
| 2010/0188979 A1 | 7/2010 | Thubert et al. |
| 2010/0191915 A1 | 7/2010 | Spencer |
| 2010/0208881 A1 | 8/2010 | Kawamura |
| 2010/0217837 A1 | 8/2010 | Ansari |
| 2010/0217982 A1 | 8/2010 | Brown et al. |
| 2010/0232594 A1 | 9/2010 | Lawson |
| 2010/0235539 A1 | 9/2010 | Carter et al. |
| 2010/0250946 A1 | 9/2010 | Korte et al. |
| 2010/0251329 A1 | 9/2010 | Wei |
| 2010/0251340 A1 | 9/2010 | Martin et al. |
| 2010/0265825 A1 | 10/2010 | Blair et al. |
| 2010/0281108 A1 | 11/2010 | Cohen |
| 2010/0291910 A1 | 11/2010 | Sanding et al. |
| 2010/0299437 A1 | 11/2010 | Moore |
| 2010/0312919 A1 | 12/2010 | Lee et al. |
| 2010/0332852 A1 | 12/2010 | Vembu et al. |
| 2011/0026516 A1 | 2/2011 | Roberts et al. |
| 2011/0029882 A1 | 2/2011 | Jaisinghani |
| 2011/0029981 A1 | 2/2011 | Jaisinghani |
| 2011/0053555 A1 | 3/2011 | Cai et al. |
| 2011/0078278 A1 | 3/2011 | Cui et al. |
| 2011/0081008 A1 | 4/2011 | Lawson et al. |
| 2011/0083069 A1 | 4/2011 | Paul et al. |
| 2011/0083179 A1 | 4/2011 | Lawson et al. |
| 2011/0093516 A1 | 4/2011 | Geng et al. |
| 2011/0096673 A1 | 4/2011 | Stevenson et al. |
| 2011/0110366 A1 | 5/2011 | Moore et al. |
| 2011/0131293 A1 | 6/2011 | Mori |
| 2011/0138453 A1 | 6/2011 | Verma |
| 2011/0143714 A1 | 6/2011 | Keast |
| 2011/0145049 A1 | 6/2011 | Udo et al. |
| 2011/0149810 A1 | 6/2011 | Koren et al. |
| 2011/0149950 A1 | 6/2011 | Petit-Huguenin et al. |
| 2011/0151884 A1 | 6/2011 | Zhao |
| 2011/0158235 A1 | 6/2011 | Senga |
| 2011/0167172 A1 | 7/2011 | Roach et al. |
| 2011/0170505 A1 | 7/2011 | Rajasekar et al. |
| 2011/0176537 A1 | 7/2011 | Lawson et al. |
| 2011/0179126 A1 | 7/2011 | Wetherell et al. |
| 2011/0211679 A1 | 9/2011 | Mezhibovsky et al. |
| 2011/0251921 A1 | 10/2011 | Kassaei et al. |
| 2011/0253693 A1 | 10/2011 | Lyons et al. |
| 2011/0255675 A1 | 10/2011 | Jasper et al. |
| 2011/0258432 A1 | 10/2011 | Rao |
| 2011/0265168 A1 | 10/2011 | Lucovsky et al. |
| 2011/0265172 A1 | 10/2011 | Sharma |
| 2011/0267985 A1 | 11/2011 | Wilkinson et al. |
| 2011/0274111 A1 | 11/2011 | Narasappa et al. |
| 2011/0276892 A1 | 11/2011 | Jensen-Horne et al. |
| 2011/0276951 A1 | 11/2011 | Jain |
| 2011/0280390 A1 | 11/2011 | Lawson et al. |
| 2011/0283259 A1 | 11/2011 | Lawson et al. |
| 2011/0289126 A1 | 11/2011 | Aikas et al. |
| 2011/0289162 A1 | 11/2011 | Furlong et al. |
| 2011/0299672 A1 | 12/2011 | Chiu et al. |
| 2011/0310902 A1 | 12/2011 | Xu |
| 2011/0313950 A1 | 12/2011 | Nuggehalli et al. |
| 2011/0320449 A1 | 12/2011 | Gudlavenkatasiva |
| 2011/0320550 A1 | 12/2011 | Lawson et al. |
| 2012/0000903 A1 | 1/2012 | Baarman et al. |
| 2012/0011274 A1 | 1/2012 | Moreman |
| 2012/0017222 A1 | 1/2012 | May |
| 2012/0023531 A1 | 1/2012 | Meuninck et al. |
| 2012/0023544 A1 | 1/2012 | Li et al. |
| 2012/0027228 A1 | 2/2012 | Rijken et al. |
| 2012/0028602 A1 | 2/2012 | Lisi et al. |
| 2012/0036574 A1 | 2/2012 | Heithcock et al. |
| 2012/0039202 A1 | 2/2012 | Song |
| 2012/0059709 A1 | 3/2012 | Lieberman et al. |
| 2012/0079066 A1 | 3/2012 | Li et al. |
| 2012/0083266 A1 | 4/2012 | VanSwol et al. |
| 2012/0089572 A1 | 4/2012 | Raichstein et al. |
| 2012/0094637 A1* | 4/2012 | Jeyaseelan ............ H04L 51/02 455/412.2 |
| 2012/0101952 A1 | 4/2012 | Raleigh et al. |
| 2012/0110564 A1 | 5/2012 | Ran et al. |

(56) References Cited

U.S. PATENT DOCUMENTS

| | | |
|---|---|---|
| 2012/0114112 A1 | 5/2012 | Rauschenberger et al. |
| 2012/0149404 A1 | 6/2012 | Beattie et al. |
| 2012/0166488 A1 | 6/2012 | Kaushik et al. |
| 2012/0170726 A1 | 7/2012 | Schwartz |
| 2012/0173610 A1 | 7/2012 | Bleau |
| 2012/0174095 A1 | 7/2012 | Natchadalingam et al. |
| 2012/0179646 A1 | 7/2012 | Hinton |
| 2012/0179907 A1 | 7/2012 | Byrd et al. |
| 2012/0180021 A1 | 7/2012 | Byrd et al. |
| 2012/0180029 A1 | 7/2012 | Hill et al. |
| 2012/0185561 A1 | 7/2012 | Klein |
| 2012/0198004 A1 | 8/2012 | Watte |
| 2012/0201238 A1 | 8/2012 | Lawson et al. |
| 2012/0208495 A1 | 8/2012 | Lawson et al. |
| 2012/0221603 A1 | 8/2012 | Kothule et al. |
| 2012/0226579 A1 | 9/2012 | Ha et al. |
| 2012/0239757 A1 | 9/2012 | Firstenberg et al. |
| 2012/0240226 A1 | 9/2012 | Li |
| 2012/0246273 A1 | 9/2012 | Bornstein et al. |
| 2012/0254828 A1 | 10/2012 | Aiylam et al. |
| 2012/0266258 A1 | 10/2012 | Tuchman |
| 2012/0281536 A1 | 11/2012 | Gell et al. |
| 2012/0288082 A1 | 11/2012 | Segall |
| 2012/0290706 A1 | 11/2012 | Lin et al. |
| 2012/0304245 A1 | 11/2012 | Lawson |
| 2012/0304275 A1 | 11/2012 | Ji et al. |
| 2012/0316809 A1 | 12/2012 | Egolf et al. |
| 2012/0321058 A1 | 12/2012 | Eng et al. |
| 2012/0321070 A1 | 12/2012 | Smith et al. |
| 2013/0024507 A1* | 1/2013 | Lifshits .............. G06Q 50/01 709/204 |
| 2013/0029629 A1 | 1/2013 | Lindholm et al. |
| 2013/0031158 A1 | 1/2013 | Salsburg |
| 2013/0031613 A1 | 1/2013 | Shanabrook |
| 2013/0035427 A1 | 2/2013 | Kimura et al. |
| 2013/0036476 A1 | 2/2013 | Roever et al. |
| 2013/0047232 A1 | 2/2013 | Tuchman et al. |
| 2013/0054517 A1 | 2/2013 | Beechuk |
| 2013/0054684 A1 | 2/2013 | Brazier et al. |
| 2013/0058262 A1 | 3/2013 | Parreira |
| 2013/0067232 A1 | 3/2013 | Cheung et al. |
| 2013/0067448 A1 | 3/2013 | Sannidhanam et al. |
| 2013/0097298 A1 | 4/2013 | Ting et al. |
| 2013/0110658 A1 | 5/2013 | Lyman et al. |
| 2013/0132573 A1 | 5/2013 | Lindblom |
| 2013/0139148 A1 | 5/2013 | Berg et al. |
| 2013/0156024 A1 | 6/2013 | Burg |
| 2013/0166580 A1 | 6/2013 | Maharajh et al. |
| 2013/0179942 A1 | 7/2013 | Caplis et al. |
| 2013/0201909 A1 | 8/2013 | Bosch et al. |
| 2013/0204786 A1 | 8/2013 | Mattes et al. |
| 2013/0212603 A1 | 8/2013 | Cooke et al. |
| 2013/0244632 A1 | 9/2013 | Spence et al. |
| 2013/0246944 A1 | 9/2013 | Pandiyan et al. |
| 2013/0268676 A1 | 10/2013 | Martins et al. |
| 2013/0325934 A1 | 12/2013 | Fausak et al. |
| 2013/0328997 A1 | 12/2013 | Desai |
| 2013/0336472 A1 | 12/2013 | Fahlgren et al. |
| 2014/0013400 A1 | 1/2014 | Warshavsky |
| 2014/0025503 A1 | 1/2014 | Meyer et al. |
| 2014/0058806 A1 | 2/2014 | Guenette et al. |
| 2014/0064467 A1 | 3/2014 | Lawson |
| 2014/0072115 A1 | 3/2014 | Makagon et al. |
| 2014/0073291 A1 | 3/2014 | Hildner et al. |
| 2014/0095627 A1 | 4/2014 | Romagnino |
| 2014/0101058 A1 | 4/2014 | Castel et al. |
| 2014/0101149 A1 | 4/2014 | Winters |
| 2014/0105372 A1 | 4/2014 | Nowack et al. |
| 2014/0106704 A1 | 4/2014 | Cooke et al. |
| 2014/0122600 A1 | 5/2014 | Kim et al. |
| 2014/0123187 A1 | 5/2014 | Reisman |
| 2014/0126715 A1 | 5/2014 | Lum et al. |
| 2014/0129363 A1 | 5/2014 | Lorah et al. |
| 2014/0153565 A1 | 6/2014 | Lawson et al. |
| 2014/0185490 A1 | 7/2014 | Holm et al. |
| 2014/0254600 A1 | 9/2014 | Shibata et al. |
| 2014/0258481 A1 | 9/2014 | Lundell |
| 2014/0269333 A1 | 9/2014 | Boerjesson |
| 2014/0274086 A1 | 9/2014 | Boerjesson et al. |
| 2014/0282473 A1 | 9/2014 | Saraf et al. |
| 2014/0289391 A1 | 9/2014 | Balaji et al. |
| 2014/0304054 A1 | 10/2014 | Orun et al. |
| 2014/0317640 A1 | 10/2014 | Harm |
| 2014/0355600 A1 | 12/2014 | Lawson |
| 2014/0372508 A1 | 12/2014 | Fausak et al. |
| 2014/0372509 A1 | 12/2014 | Fausak et al. |
| 2014/0372510 A1 | 12/2014 | Fausak et al. |
| 2014/0373098 A1 | 12/2014 | Fausak et al. |
| 2014/0379670 A1 | 12/2014 | Kuhr |
| 2015/0004932 A1 | 1/2015 | Kim et al. |
| 2015/0004933 A1 | 1/2015 | Kim et al. |
| 2015/0023251 A1 | 1/2015 | Giakoumelis et al. |
| 2015/0026477 A1 | 1/2015 | Malatack et al. |
| 2015/0066865 A1 | 3/2015 | Yara et al. |
| 2015/0081918 A1 | 3/2015 | Nowack et al. |
| 2015/0082378 A1 | 3/2015 | Collison |
| 2015/0100634 A1 | 4/2015 | He et al. |
| 2015/0119050 A1 | 4/2015 | Liao et al. |
| 2015/0181631 A1 | 6/2015 | Lee et al. |
| 2015/0236905 A1 | 8/2015 | Bellan et al. |
| 2015/0281294 A1 | 10/2015 | Nur et al. |
| 2015/0304934 A1 | 10/2015 | Malatack |
| 2015/0365480 A1 | 12/2015 | Soto et al. |
| 2015/0370788 A1 | 12/2015 | Bareket et al. |
| 2015/0381580 A1 | 12/2015 | Graham, II |
| 2016/0011758 A1 | 1/2016 | Dornbush et al. |
| 2016/0028695 A1 | 1/2016 | Binder |
| 2016/0073319 A1 | 3/2016 | Malatack |
| 2016/0077693 A1 | 3/2016 | Meyer et al. |
| 2016/0112475 A1 | 4/2016 | Lawson et al. |
| 2016/0112521 A1 | 4/2016 | Lawson et al. |
| 2016/0119291 A1 | 4/2016 | Zollinger et al. |
| 2016/0127254 A1 | 5/2016 | Kumar et al. |
| 2016/0149956 A1 | 5/2016 | Birnbaum et al. |
| 2016/0162172 A1 | 6/2016 | Rathod |
| 2016/0205519 A1 | 7/2016 | Patel et al. |
| 2016/0226937 A1 | 8/2016 | Patel et al. |
| 2016/0226979 A1 | 8/2016 | Lancaster et al. |
| 2016/0234391 A1 | 8/2016 | Wolthuis |
| 2016/0239770 A1 | 8/2016 | Batabyal et al. |
| 2017/0339283 A1 | 11/2017 | Chaudhary et al. |

FOREIGN PATENT DOCUMENTS

| | | |
|---|---|---|
| EP | 1387239 A2 | 2/2004 |
| EP | 1464418 | 10/2004 |
| EP | 1522922 | 4/2005 |
| EP | 1770586 | 4/2007 |
| EP | 2053869 | 4/2009 |
| ES | 2134107 | 9/1999 |
| GB | 2362489 A | 11/2001 |
| JP | 10294788 | 4/1998 |
| JP | 2004166000 | 6/2004 |
| JP | 2004220118 | 8/2004 |
| JP | 2006319914 | 11/2006 |
| WO | 9732448 A | 9/1997 |
| WO | WO-0131483 A2 | 5/2001 |
| WO | WO-0167219 A1 | 9/2001 |
| WO | WO-0219593 A2 | 3/2002 |
| WO | WO-0235486 A1 | 5/2002 |
| WO | WO-02052879 A1 | 7/2002 |
| WO | 2002087804 | 11/2002 |
| WO | WO-03063411 A1 | 7/2003 |
| WO | 2006037492 A | 4/2006 |
| WO | 018489 | 2/2009 |
| WO | 2009124223 A | 10/2009 |
| WO | 2010037064 | 4/2010 |
| WO | 2010040010 A | 4/2010 |
| WO | 2010101935 A | 9/2010 |
| WO | 2011091085 A | 7/2011 |

(56) References Cited

OTHER PUBLICATIONS

Abu-Lebdeh et al. "A 3GPP Evolved Packet Core-Based Architecture for QoS-Enabled Mobile Video Surveillance Applications". 2012 Third International Conference on the Network of the Future (NOF). Nov. 21-23, 2012. pp. 1-6.
Archive Microsoft Office 365 Email | Retain Unified Archiving, 2015, GWAVA, Inc., Montreal, Canada.
Complaint for Patent Infringement, *Telinit Technologies, LLC* v. *Twilio Inc.*, dated Oct. 12, 2012.
Kim et al. "In-service Feedback QoE Framework" 2010 Third International Conference on Communication Theory. Reliability and Quality of Service. pp. 135-138. 2010.
Matos et al. "Quality of Experience-based Routing in Multi-Service Wireless Mesh Networks" Realizing Advanced Video Optimized Wireless Networks. IEEE. pp. 7060-7065. 2012.
NPL, "API Monetization Platform", 2013.
RFC 3986: Uniform Resource Identifier (URI): Generic Syntax; T. Berners-Lee, R. Fielding, L. Masinter; Jan. 2005; The Internet Society.
S. barakovic and L. Skorin-Kapov. "Survey and Challenges of QoE Management Issues in Wireless Networks". 2012, pp. 1-29.
Subramanya, et al. "Digital Signatures", IEEE Potentials, Mar./Apr. 2006, pp. 5-8.
Tran et al. "User to User adaptive routing based on QoE" ICNS 2011: The Seventh International Conference on Networking and Services. pp. 170-177. 2011.
Twilio Cloud Communications—APIs for Voice, VoIP, and Text Messaging, Twilio.
Wu et al. "Quality Evaluation in Peer-to-Peer IPTV Services" Data Traffic and Monitoring Analysis, LNCS 7754. pp. 302-319. 2013.
"U.S. Appl. No. 14/690,252, Notice of Allowance dated Aug. 31, 2015", 10 pgs.
"U.S. Appl. No. 14/944,869, Corrected Notice of Allowability dated Dec. 20, 2017", 2 pgs.
"U.S. Appl. No. 14/944,869, Examiner Interview Summary dated Sep. 15, 2017", 3 pgs.
"U.S. Appl. No. 14/944,869, Non Final Office Action dated Jun. 16, 2017", 15 pgs.
"U.S. Appl. No. 14/944,869, Notice of Allowance dated Oct. 13, 2017", 8 pgs.
"U.S. Appl. No. 14/944,869, Response filed Sep. 12, 2017 to Non Final Office Action dated Jun. 16, 2017", 12 pgs.
"[Proposed] Order Granting Defendant Telesign Corporation's Motion to Dismiss", *Twilio, Inc.,* v. *Telesign Corporation,* Case No. 5:16-cv-6925-LHK, filed Jan. 25, 2017, 2 pgs.
"ActivCard", [Online]. Retrieved from the Internet: <URL: http://www.activcard.com:80/products/client/tokens/token.pdf>, (1998), 26 pgs.
"ASB Bank selects RSA Mobile two-factor authentication for Internet security; Leading New Zealand bank to integrate RSA Mobile solution to expand business opportunities and enhance", RSA Security, M2 Presswire; Coventry [Coventry], (Jun. 23, 2003), 4 pgs.
"Authenex", [Online]. Retrieved from the Internet: <URL: http://www.authenex.com:80./isaserver/pdf/psasas.pdf>, (2003), 34 pgs.
"Aventail partners with phone-based two-factor authentication company; Aventail and SecurEnvoy join forces to offer easy-to-use authentication from mobile devices for secure, remote access", Aventail-M2 Presswire; Coventry [Coventry], (Dec. 7, 2005), 4 pgs.
"Carrierinfo-Product Guide", MapInfo Corporation, (2005), 36 pgs.
"CDyne Phone Verifier", Background_Web_Archive, (2005), 4 pgs.
"Classifying m-payments—a user-centric model", Proceedings of the Third International Conference on Mobile Business, M-Business, (2004), 11 pgs.
"Complaint for Patent Infringement—Jury Trial Demanded", *Twilio Inc.,* vs. *Telesign Corporation,* Case 3:16-cv-06925 filed Dec. 1, 2016, 240 pgs.
"Crypto-Tokens", CryptoCard, 12 pgs.
"Cyber Locator", (1999), 7 pgs.

"Declaration of Jesse J. Camacho in Support of Defendant Telesign Corporation's Reply to Motion to Dismiss", *Twilio, Inc.,* v. *Telesign Corporation,* Case No. 5:16-cv-6925-LHK, filed Feb. 15, 2017, 17 pgs.
"Defendant Telesign Corporation's Notice of Motion and Motion to Dismiss; Memorandum of Points and Authorities in Support Thereof", *Twilio, Inc.,* v. *Telesign Corporation,* Case No. 5:16-cv-6925-LHK, filed Jan. 25, 2017, 32 pgs.
"Defendant Telesign Corporation's Reply in Support of Motion to Dismiss", *Twilio, Inc.,* v. *Telesign Corporation,* Case No. 5:16-cv-6925-LHK, filed Feb. 15, 2017, 22 pgs.
"Digipass® Go 1", Vasco, (2001), 36 pgs.
"Diversinet", MobiSecure, 2 pgs.
"Entrust", Entrust TruePass™ Product Portfolio, 28 pgs.
"eToken", Aladdin Knowledge Systems, [Online]. Retrieved from the Internet: <URL: http://www.aladdin.com:80/etoken/products.asp>, (2005), 20 pgs.
"File History U.S. Pat. No. 8,351,369", 295 pgs.
"File History U.S. Pat. No. 8,462,920 B2", 322 pgs.
"File History U.S. Pat. No. 8,737,593", 261 pgs.
"File History U.S. Pat. No. 8,755,376 B2", 1084 pgs submitted in 6 parts due to size.
"Fone Finder", (Feb. 4, 2005), 12 pgs.
"iKey 2032", Personal USB Authentication and Encryption Token, [Online] Retrieved from the Internet: <http://www,safenet-inc.corn:80/library/3/iKey_2032.pdf>, (2005), 5 pgs.
"International Numbering Plans", Background_Web_Archive, (2005), 1 pg.
"Maag Holdings Selects RSA Security to Help Protect its Real Estate Information System", 5 pgs.
"Microsoft Targets Mobile Developers with Tools and Devices", Mobile Business Advisor, (2003), 1 pg.
"Multi-Factor Authentication Employing Voice Biometrics and Existing Infrastructures", Background_Web_Archive_Authentify, (2005), 15 pgs.
"Open Service Access (OSA); Parlay X Web Services; Part 2: Third Party Call (Parlay X 2)", ETSI ES 202 391-2 V1.2.1, (Dec. 2006), 18 pgs.
"Open Service Access (OSA); Parlay X Web Services; Part 4: Short Messaging (Parlay X 2)", ETSI ES 202 391-4 V1.2.1, (Dec. 2006), 26 pgs.
"Open Service Access (OSA); Parlay X Web Services; Part 7: Account Management (Parlay X 2)", ETSI ES 202 391-7 V1.2.1, (Dec. 2006), 22 pgs.
"Order Granting in Part and Denying in Part Defendant's Motion to Dismiss", *Twilio, Inc.,* v. *Telesign Corporation,* Case No. 16-CV-06925-LHK, Re: Dkt. No. 31, filed Mar. 31, 2017, 58 pgs.
"Order Granting in Part Defendant's Motion to Dismiss", *Twilio, Inc.,* v. *Telesign Corporation,* Case No. 16-CV-06925-LHK, Re: Dkt. No. 31, filed Apr. 17, 2017, 54 pgs.
"PhoneID Fraud Prevention", Delivers real-time security intelligence and data on phone numbers around the world to enable greater assurance and security against fraudulent activity, (Jun. 15, 2015), 7 pgs.
"PhoneID Score", PhoneID Score—TeleSign Rest API v1.50 documentation, (Jun. 16, 2015), 10 pgs.
"PhoneID Standard", PhoneID Standard—TeleSign Rest API v1.50 documentation, (Jun. 16, 2015), 1-10.
"Plaintiff's Opposition to Defendant's Motion to Dismiss", *Twilio Inc.,* vs. *Telesign Corporation,* Case No. 5:16-CV-06925-LHK, filed Feb. 8, 2017, 28 pgs.
"Q3 2002 RSA Security Earnings Conference Call—Final", Dow Jones, (Oct. 16, 2002), 12 pgs.
"Q4 2002 RSA Security Earnings Conference Call—Final", Dow Jones, (Jan. 23, 2003), 8 pgs.
"Requests", TeleSign Rest API v1.51 documentation, (Nov. 3, 2015), 1 pg.
"Resources", TeleSign Rest API v1.51 documentation, (Nov. 2, 2015), 2 pgs.
"Responses", TeleSign Rest API v1.51 documentation, (Nov. 3, 2015), 1 pg.

(56) References Cited

OTHER PUBLICATIONS

"Risk factor put on hold—Security Solutions—Data Under Siege—A special advertising report", The Australian—Dow Jones, (Sep. 24, 2002), 1 pg.
"RSA launches authentication solutions", The China Post—Dow Jones, (Sep. 14, 2002), 2 pgs.
"RSA Mobile", Two-factor authentication for a mobile world, 6 pgs.
"RSA SecurID® Authentication", A Better Value for a Better ROI, (2003), 34 pgs.
"RSA Security and iRevolution Join Forces to Offer Two-Factor Authentication for Companies Using Microsoft(R) Passport", PR Newswire; New York, (Oct. 8, 2002), 4 pgs.
"RSA Security and Nocom launch new service in Scandinavia: Flexible and secure solution for user identification", NASDAQ OMX—Dow Jones, (Sep. 9, 2003), 2 pgs.
"RSA Security Announces Third Quarter Results" PR Newswire—Dow Jones, (Oct. 16, 2002), 10 pgs.
"RSA Security Helps Banca Popolare di Sondrio (Suisse) Differentiate Itself from the Competition", PR Newswire; New York, (Apr. 15, 2003), 4 pgs.
"RSA Security technology helps make an innovative information management solution even more compelling to the marketplace", Maag Holdings Ltd., (2004), 3 pgs.
"RSA Security Unveils Innovative Two-Factor Authentication Solution for the Consumer Market", PR Newswire; New York, (Sep. 4, 2002), 5 pgs.
"RSA Security uses phones as security token. (Business)", RCR Wireless News. 21.36, Academic OneFile, [Online] Retrieved from the Internet : <http://link.galegroup.com/apps/doc/A91672329/AONE?u=otta35732&sid=AONE&xid=2f576581>, (Sep. 9, 2002), 1 pg.
"RSA(R) Mobile and RSA SecurID(R) Two-Factor Authentication Products Recognized by SC Magazine as Best of 2002", PR Newswire—Dow Jones, (Dec. 12, 2002), 2 pgs.
"Saintlogin", Bachground_Web_Archive, (2005), 3 pgs.
"score()—TeleSign Python SDK documentation", score(), (Jun. 16, 2015), 2 pgs.
"Scottrade Selects PassMark for Strong Mutual Authentication", PassMark, (Oct. 11, 2005), 8 pgs.
"SecurAccess Overview Video", Securenvoy—Date for Overview.swf, [Online]. [Accessed Jan. 20, 2005]. Retrieved from the Internet: <URL: www.securenvoy.com/animations/Overview.swf>, 14 pgs.
"SecurAccess User Guide Video", Securenvoy—Date for UserGuide.swf, [Online]. [Accessed Sep. 30, 2004]. Retrieved from the Internet: <URL: http://www.securenvoy.com/animations/UserGuide.swf>, 17 pgs.
"SecurAccess Video", Securenvoy—Date for SecurAccess.swf, [Online]. [Accessed May 5, 2006]. Retrieved from the Internet: <URL: http://www.securenvoy.com:80/animations/SecurAccess.swf>, 8 pgs.
"Securenvoy", Secure Email, (2004), 6 pgs.
"SecurEnvoy SecurAccess", Protecting Access from outside the perimeter, (2005), 6 pgs.
"SecurMail and SecurAccess", Securenvoy, 1 pg.
"Siemens", System Description HiPath 3000 Version 1.2-3.0, (2002), 762 pgs.
"Simple, secure access control for the Web", using SafeWord™ PremierAccess, (Nov. 2001), 46 pgs.
"Smart Verify | TeleSign", Smart Verify, (Nov. 3, 2015), 9 pgs.
"SMS Authentication", RSA Security Inc. Published in ComputerWorld Sep. 23, 2002, Technology, p. 38, (Sep. 23, 2002), 1 pg.
"SMS Verify—TeleSign", SMS Verify, (Nov. 3, 2015), 8 pgs.
"Taking security online to new level", Dow Jones, (2005), 2 pgs.
"TeleSign's PhoneID Score Named a New Products Winner", TeleSign, (Jun. 27, 2014), 4 pgs.
"Trailblazers: RSA Security (specialises in access management tools for internal security)", Dow Jones, (2003), 1 pg.
"Unified Authentication", Verisign (Mar. 21, 2005), 196 pgs.
"Verify Registration—TeleSign Rest API v1.51 documentation", Verify Registration, (Nov. 3, 2015), 7 pgs.
"Voice Verify with Call Forward Detection", TeleSign Verification APIs, (2015), 2 pgs.
"What's a Mobile Phone, anyway?", Australian PC World: Off Camera Fun, (Jun. 2005), 1 pg.
"Wifi WatchDog", Newbury Networks, (2006), 11 pgs.
Bennett, Robert, "American business has to start thinking of data with the same reverence that it thinks of money!", Griffin Technologies, LLC. White Paper, (Oct. 2001), 6 pgs.
Curphey, Mark, et al., "A Guide to Building Secure Web Applications: The Open Web Application Security Project", (2002), 70 pgs.
Doyle, Eric, "RSA uses SMS to offer secure Web access anywhere", (2002), 1 pg.
Fonseca, Brian, "RSA and Entrust target Web services security returns", Dow Jones, (Oct. 8, 2002), 2 pgs.
Forbes, Bob, "The Fifth Factor: Behavior Profiling Opens New Possibilities for Web Access Control", Data Security Management, 8 pgs.
Fred, Piper, et al., "Identities and authentication", Cyber Trust & Crime Prevention Project, (Apr. 6, 2004), 1-15.
Hill, Kashmir, "Your Phone Number is Going to Get a Reputation Score Forbes", Forbes, (Jun. 16, 2015), 4 pgs.
Jamieson, Rodger, et al., "A Framework for Security, Control and Assurance of Knowledge Management Systems", School of Information Systems, Technology and Management, University of New South Wales, Sydney, Australia, Chapter 25, (2004), 29 pgs.
Jones, Dow, "Awakens to the Fact That Prevention is Better Than Cure", India Inc., (Mar. 31, 2003), 1 pg.
Jones, Dow, "Event Brief of Q3 2002 RSA Security Earnings Conference Call—Final", (Oct. 16, 2002), 5 pgs.
Jones, Dow, "Make sure you're secure", Bristol Evening Post, (Oct. 25, 2004), 2 pgs.
Jones, Dow, "Regulatory News Service (RNS)", REG-iRevolution Group Announces Partnership, (Oct. 9, 2002), 2 pgs.
Jörg, Tacke, et al., "Two-Factor Web Authentication Via Voice", Voice.Trust AG1, 88 pgs.
Kemshall, A., et al., "Two Factor Authentication", securenvoy_ White Paper, (2005), 8 pgs.
Kotanchik, J, "Kerberos and Two-Factor Authentication", (Mar. 1994), 6 pgs.
Kumar, Bharat, et al., "Breaking into Cyberia", Business Line, Dow Jones, (Nov. 5, 2003), 4 pgs.
Lebihan, Rachel, "New online banking security plan in doubt", The Australian Financial Review, Dow Jones, (Aug. 2, 2004), 2 pgs.
Lebihan, Rachel, "Still Fishing for Answer to Internet Scams", The Australian Financial Review, Dow Jones, (2004), 3 pgs.
Louise, Richardson, "RSA Security", Dow Jones, (Dec. 1, 2003), 2 pgs.
Mallery, John, "Who Are You? You just can't trust a username/password combo to verify user identity. It's time for two-factor", Security Technology & Design, (Nov. 1, 2005), 4 pgs.
McCue, Andy, "Networks—ISP trials security via SMS", Computing, (Sep. 12, 2002), 1 pg.
McCue, Andy, "SMS Secures Online Apps", Itweek, Dow Jones, (Sep. 9, 2002), 2 pgs.
McCue, Andy, "United Utilities pilots SMS security software", VNUnet Newswire, Dow Jones, (Sep. 4, 2002), 2 pgs.
Messmer, Ellen, "HIPAA deadline ups healthcare anxiety", Network World, (Mar. 10, 2003), 1 pg.
Mills, Kelly, "Security merger to boost banks", The Australian—Dow Jones, (2005), 2 pgs.
Mizuno, Shintaro, et al., "Authentication Using Multiple Communication Channels", (Nov. 11, 2005), 9 pgs.
Nguyan, Thien-Loc, "National Identification Systems", (Jun. 2003), 156 pgs.
Nystrom, M, "The SecurID(r) SASL Mechanism", RSA Laboratories, (Apr. 2000), 11 pgs.
O'Gorman, "Comparing Passwords, Tokens, and Biometrics for User Authentication", In Proceedings: The IEEE, vol. 91, Issue 12, (Dec. 2003), 20 pgs.
O'Gorman, Lawrence, et al., "Call Center Customer Verification by Query-Directed Passwords", 15 pgs.

(56) References Cited

OTHER PUBLICATIONS

Parthasarathy, P R, "Resolving Webuser on the Fly", (Jun. 2002), 6 pgs.
Pullar-Strecker, Tom, "Asb Shuts Out Online Fraud", (Sep. 27, 2004), 2 pgs.
Pullar-Strecker, Tom, "Auckland Security Firm Turns Heads", (May 30, 2005), 3 pgs.
Pullar-Strecker, Tom, "NZ bank adds security online", (Nov. 8, 2004), 1 pg.
Pullar-Strecker, Tom, et al., "NZ start-up plans authentication trial", (Aug. 23, 2004), 3 pgs.
Scarlet, Pruitt, "RSA secures mobile access to Web apps", Dow Jones—InfoWorld Daily News, (Sep. 4, 2002), 1 pg.
Tynan, Dan, "What's a Cell Phone, Anyway?", PC World.Com ; San Francisco, (Mar. 23, 2005), 3 pgs.
Wall, Matthew, "Fight business marauders the high-tech way", Sunday Times ; London (UK), (Sep. 18, 2005), 4 pgs.
Wolfe, Daniel, "For PassMark, Image is Everything in Phish Foiling", American Banker. 169.43, (Mar. 4, 2004), 2 pgs.
Wright, Rob, "Paramount Protection Vendors have devised new ways to safeguard information", VARbusiness, (Oct. 28, 2002), 4 pgs.
Wu, Min, et al., "Secure Web Authentication with Mobile Phones", DIMACS Workshop on Usable Privacy and Security Software, (Jul. 2004), 5 pgs.
Wullems, Chris, et al., "Enhancing the Security of Internet Applications using location : A New Model for Tamper-resistant GSM Location", Proceedings of the Eighth IEEE International Symposium on Computers and Communication (ISCC'03), (2003), 9 pgs.
"Final Written Decision 35 U.S.C. § 318(a)", *Telesign Corporation v. Twilio Inc.,* Case IPR2017-01976, Patent 8,837,465B2, (Mar. 6, 2019), 42 pgs.
"Final Written Decision 35 U.S.C. § 318(a)", *Telesign Corporation v. Twilio Inc.,* Case IPR2017-01977, Patent 8,755,376B2, (Mar. 6, 2019), 51 pgs.
"Open Service Access (OSA); Parlay X Web Services; Part 11: Audio Call (Parlay X 2)", ETSI ES 202 391-11 V1.2.1, (Dec. 2006), 19 pgs.
"Open Service Access (OSA); Parlay X Web Services; Part 3: Call Notification (Parlay X 2)", ETSI ES 202 391-3 V1.2.1, (Dec. 2006), 23 pgs.
Hong, Sungjune, et al., "The semantic Parlay for 4G network", 2nd International Conference on Mobile Technology, Applications and Systems. IEEE, (2005), 5 pgs.

* cited by examiner

SYSTEM AND METHOD FOR ENABLING MULTI-MODAL COMMUNICATION

CROSS-REFERENCE TO RELATED APPLICATIONS

This application is a continuation of U.S. patent application Ser. No. 14/944,869, filed 18 Nov. 2015, now U.S. Pat. No. 9,907,010 which is a continuation of U.S. patent application Ser. No. 14/690,252, filed 17 Apr. 2015, now issued as U.S. Pat. No. 9,226,217, which claims the benefit of U.S. Provisional Application Ser. No. 61/980,749, filed on 17 Apr. 2014, which is incorporated in its entirety by this reference.

TECHNICAL FIELD

This invention relates generally to the telecommunication field, and more specifically to a new and useful system and method for enabling multi-modal communication in the telecommunication field.

BACKGROUND

Mobile internet has brought about a wide variety of modes of communication. Mobile phone devices are capable of telephony communication such as SMS, MMS, and PSTN voice calls, as well as IP based communication such as client application messaging and VoIP. Despite the numerous modes of communication, communication applications are limited to the initial mode of established communication. Additionally, the internet and the growth of internet enabled mobile devices have led to the expansion and wide adoption of over the top (OTT) communication as an alternative to communicating through channels provided by traditional telecommunication entities, such as phone service providers. The use of OTT entities can fragment the communication channels so that only those within an OTT provider can communicate. Thus, there is a need in the telecommunication field to create a new and useful system and method for enabling multi-modal communication. This invention provides such a new and useful system and method.

DESCRIPTION OF THE PREFERRED EMBODIMENTS

The following description of preferred embodiments of the invention is not intended to limit the invention to these preferred embodiments, but rather to enable any person skilled in the art to make and use this invention.

1. System for Enabling Multi-Modal Communication

Figure 1:
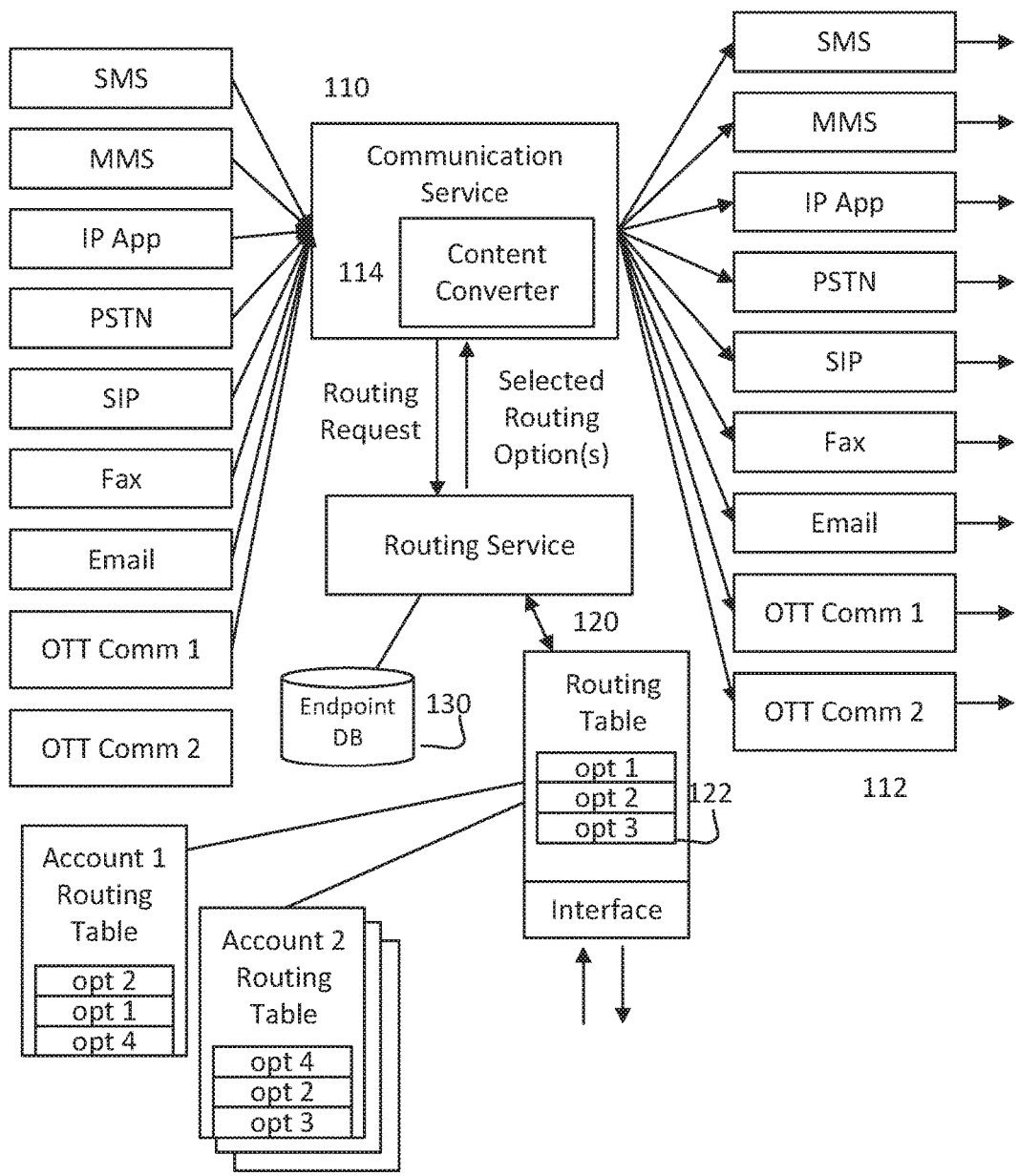
FIG. 1 is schematic representation of a system of a first preferred embodiment.

As shown in FIG. 1, a system 100 for enabling multi-modal communication of a preferred embodiment can include a communication system no with a plurality of routing options 112 a content conversion engine 114, a routing system 120 that includes a plurality of routing option profiles 122, and an endpoint information repository 130. The system functions to enable transparent multi-modal communication through a communication platform. The multi-modal communication is preferably transparent to users of the system in that an entity requesting communication expresses communication intent, and the system appropriately establishes the communication with a desired endpoint using a suitable transport protocol. Additionally, the system can manage full-duplex multi-modal communication—message and communication session responses can be similarly transparently managed by the system.

In one preferred embodiment, the system can additionally or alternatively function to facilitate communication through one or more OTT communication providers. An OTT entity is preferably a third party communication platform. The OTT entity preferably communicates is an internet protocol (IP) communication, and may use proprietary communication protocols. OTTs are preferably application operable on mobile devices and personal computing devices. An OTT entity can provide instant message communication; picture, video, audio, and media sharing; synchronous voice, video, screen sharing and other forms of media communication; and/or any suitable form of communication. Such OTT entities may provide additional services in connection to or in addition to communication. For example, an OTT entity may be a social network, primarily an instant messaging service, time-limited media sharing apps, a gaming application, conferencing systems, team/enterprise applications, and/or any suitable type of application with an aspect of communication. The system is preferably configured to operate alongside or as an alternative layer to communicating within the OTT system. The system preferably allows at least one direction of communication with at least one OTT entity. For example, communication can be established inbound to the OTT platform, but the communication may additionally or alternatively be received from the OTT and delivered to another destination.

The system is preferably integrated with a multitenant communication platform that provides communication services to developer applications and services. The system is preferably implemented in combination with a telephony platform such as the one described in patent application Ser. No. 12/417,630 filed 2 Apr. 2009, entitled "System and Method for Processing Telephony Sessions", which is hereby incorporated in its entirety by this reference. The telephony platform preferably includes application execution in connection to communications sessions and/or messages; the telephony platform may additionally or alternatively provide an application programming interface (API) as an alternative for interacting with communication functionality of the telephony platform. The telephony platform is preferably a multitenant telephony platform that allows multiple accounts to configure telephony applications for use on the platform. The telephony can be designed for one or more mediums of communication. The telephony platform can additionally be a cloud hosted platform as a service system. The telephony platform can be a server, a server cluster, a collection of components on a distributed computing system, or any suitable network accessible computing infrastructure. The system may alternatively be used in combination with a text or multi-media based messaging system, a video or voice chat system, a screensharing system, and/or any suitable communication platform.

The communication system 110 of a preferred embodiment functions to receive communication requests and establish communications as regulated by input of the routing system 120 and the communication cost service 130. The communication service no can comprise of one or more services that establish communication through various channels and over varying protocols of the plurality of routing options 112.

The communication system 110 preferably includes a communication request input to receive communication requests. A communication request preferably specifies a communication destination. The communication destination can be a communication endpoint such as a telephone number, a short code phone number, a SIP address, a communication account identifier, and/or any suitable communication endpoint. The communication request additionally will include an origin identifier. In a first variation, the origin identifier will be the communication endpoint that will be connected or that will be indicated as the sender. The communication endpoint can be some variety of communication endpoints as described above. In some cases, proxy communication endpoints can be established if the endpoints of the legs of the communication do not use compatible forms of endpoints. The communication endpoint of the origin can be the same type or a different type of communication endpoint as the communication destination. The origin identifier can be explicitly included in the communication request or the origin identifier can be associated with an account associated with the communication request. A communication medium may be implicit for the communication system such as in the situation where only one medium is available, but the communication medium may alternatively be specified in the request. The medium can specify a general form of the communication, such as voice, video, text, synchronous, and/or asynchronous. The medium can alternatively specify particular protocols of communication such as SMS, MMS, PSTN, SIP, an OTT communication identity (e.g., an application or social network name), and the like. In appropriate communication requests, frequently asynchronous communication requests, the content of the communication may be included in the request. For example, the text for an SMS message is preferably included in the communication request. In other variations, the communication request is for establishing a synchronous communication session between the source and the destination such as in a voice or video call where communication can occur between at least two communication endpoints in real-time. Additionally a request can include an urgency property, which determines communication guarantees and TTL (Time to live) procedures of an established communication.

The communication request is preferably received using an application programming interface (API). More preferably the communication request is received through a representational state transfer (REST) API, Restful (i.e., having characteristics of a REST API) can include the characteristics of having a uniform interface separating client and servers, the client-server communication is stateless where all information to process a client request is transferred in the request; cacheable requests if specified, interoperability with a layered service infrastructure, and/or a uniform interface between clients and servers. The API can be exposed externally such that requests directly originate from outside entities. The API can alternatively be an internal API used during operation of the telephony platform.

The communication request can alternatively be received from an incoming communication through a supported communication transport protocol. Preferably the communication platform acts as a proxy or register for a number of endpoints, such that communications initiated outside the communication platform and directed at endpoints registered by the platform are routed to the communication platform for handling. The communication platform can include mappings of endpoints to applications, other destination endpoints, or use any suitable logic to determine a content and destination of a communication. Processing of incoming communications can be used to enable two-way transformation of communications between at least two endpoints.

The plurality of routing options 112 of a preferred embodiment functions to service communications from the system to a t least one destination endpoint. The plurality or routing options 112 preferably includes a set of different communication services that target different transport protocols. For example, the plurality of routing options 112 can include an SMS service, MMS service, a push notification service, an IP messaging service, proprietary third party OTT messaging service, proprietary third party OTT communication service, PSTN service, SIP voice service, Video communication service, screensharing service, fax service, email service, and/or any suitable communication service. Each of the communication services can include dedicated communication service instances for different routing options (e.g., different carriers, regions, and the like). Alternatively, a communication service can use multiple different routing options when communicating. The routing options can be used in transmitting messages, receiving messages, managing synchronous communication sessions, or performing any suitable operation of a given transport protocol. Depending on the message medium and possibly the origin and destination endpoints, the routing options may be different channel protocols directed at different service provider destinations. For an SMS message, the routing options may be SMPP connections to various service provider destinations. The routing options of an MMS message can be SMTP connections to various service provider destinations (for MM4) or alternatively they can be various service resources accessed over HTTP/SOAP (for MM7). A voice call can have routing options including PSTN channels of different carriers, SIP, and other protocols. The routing options preferably include various commercial relationships between the service provider and the communication platform. The routing options can additionally span multiple mediums/transport protocols. For example, a message router may be configured to selectively transmit a message using a routing option selected from SMS routing options, proprietary push notification routing options (e.g., Apple or Google push notifications) and application messaging routing options (e.g., message sent to a Whatsapp user).

The content conversion engine 114 of a preferred embodiment functions to transform content from a first form suitable for a first protocol to a second form suitable for a second form. The content conversion engine can include various media processing services, routines, and modules. The content conversion engine 114 can be a standalone service of a platform or alternatively integrated within a variety of other components such as the various routing option services 112. The content conversion engine 114 can include various media processing components such as a media transcoding engine, text-to-speech (TTS) service, speech recognition engine, and other suitable media processing services. The content conversion engine 114 can additionally include content formatting services that ensure content is suitable for communication over a selected routing option. Different routing options can have different rules such as character limits, media size limits, metadata information, security tokens, and other suitable communication properties. The formatting services can translate content to a format suitable for a message. For example, text content may require being split in to multiple messages for delivery over SMS. The content conversion engine 114 can transform content media prior to delivery to a destination. For asynchronous messages, the media is transformed and then transmitted. In synchronous communication the content conversion engine 114 could stream the converted media content such as down sampling an inbound audio stream and routing to an endpoint with a communication channel with lower bandwidth.

The routing system 120 functions to generate at least one possible routing option for the outbound routing of the communication service 110. The routing system 120 receives routing requests from the communication system 110. The routing system 120 is configured to process the request and use properties of the request to generate at least one selected/recommended routing option. More preferably the routing system generates a set of at least two routing options and returns the list to the communication system 110. The set or list of routing options can be prioritized or include parameters that can be used to select a desired routing option. The routing system 120 preferably includes a routing table. The routing table includes a list of available routing option profiles 122. In one variation, a routing option profile in the routing table preferably includes an assigned priority and a weight. The priority and weight may be assigned for different communication parameters. For example, the prefix of a destination phone number is preferably associated with various routing options each having a priority and weight. The routing table can include additionally or alternative parameters associated with the different routing options such as quality score, regional associations (e.g., related country codes or area codes or geographic proximity), quota prioritizations, internal cost (e.g., cost to the platform), effective internal cost (e.g., cost to transmit requested content considering transforming the content into multiple messages), and/or any suitable parameter used in selecting a routing option. The quota prioritization parameter can be used to prioritize a routing option in response to a contractual obligation. Some routing options can be maintained through contractual obligations of meeting a quota of communications (e.g., number of calls, number of messages, rate of communication). This quota prioritization parameter can be dynamically updated or fixed based on the communication restriction. The quota prioritization can be used to positively count towards the selection of that routing option (e.g., if a system wants to meet a certain quota of messages) or alternatively negative impact selection (e.g., if a system wants to avoid going over a limit). The relative properties for the associated routing options are used to generate a route priority list. The routing priority list is a customized list of routing options prioritized for a particular communication request. Multiple routing options are prioritized in order of preference. The listed routing options may not have indicated preference and be a sub-set of the full set of routing options.

The routing option profiles 122 functions to characterize different channels of communication available to the communication platform. As mentioned above a routing option can exist for large variety of transport protocols such as the communication protocols for SMS messaging, MMS messaging, push notifications, an IP messaging, proprietary third party OTT messaging or synchronous communication, PSTN voice, SIP voice, video communication service, screensharing, faxing, email, and/or any suitable communication protocol. The routing options can include parameters that can be used in selecting a routing option based on content type and/or urgency properties. When translating between different modes of communication, the different transport protocols can have different prioritization. For example, media messaging is preferably sent through a routing option with similar media support. The routing system 120 may additionally include a routing table interface such that an administrator or client device may update the parameters used to determine the communication routing. Routing options can preferably be added, removed, or updated. In one exemplary use case, an administrator may need to update the routing options based on contract changes with various carriers. In another exemplary use case, communication performance may unexpectedly drop for a carrier. An administrator could easily edit the routing table such that communications avoid that carrier until the issue is resolved. In yet another use case, communication quality of a used routing option is measured and used to update a quality parameter of a routing option. In another variation, the routing table interface is an application programming interface (API) such that parameters of the routing table may be automatically updated.

In one variation, an account can configure routing option profiles, which function to define routing options and routing option preferences for particular accounts and/or subsets of communication within an account. Various routing options may be configured for an endpoint. A phone number may be able to do voice calls, SMS messages, MMS messages, VoIP calls, or communicate using a third party OTT service. Various OTT entities may be registered for an endpoint, and since most of the OTT registration is achieved organically based on user activity, there will not be a uniform set of options across all endpoints. Additionally, a given account (e.g., one of an OTT provider) will want to allow communication originating from the outside OTT entity to be terminated in particular OTT services. For example social network A may not want messages to automatically rerouted to social network B if social network A is not registered. A routing option profile can exist for a particular routing option. The routing option profile identifies approved (or conversely prohibited) routing options for communications relating to a particular routing option. Additionally, the set of approved routing options can be prioritized so that communication can default to the next highest priority if the first routing option is not suitable for a particular communication. For example, an OTT entity may want the communication to first be completed using the OTT service, but if that is not available MMS is used, then SMS, then finally a second selected OTT entity. In this example, a third OTT entity may not be part of the routing profile, and accordingly communication will not be terminated in the third OTT for the subset of communications related to the routing option profile. Additionally, the routing option profile can specify different options for different forms of communication. For example, text messages may be defined to prioritize the routing options in one manner, while media messages prioritize routing options in a second manner. The routing option profile can be set for each account. Preferably each OTT entity will have an OTT account within the system, within which an administrator can set the routing option profile. Additionally, non-OTT accounts can set routing option profiles to define how communications are routed.

The information repository 130 functions to store and manage information about communication endpoints. A communication endpoint preferably has a record stored in a database or distributed through several database tables. An endpoint record may include various properties of a communication endpoint such as a unique identifier of the telephony endpoint, the direct inbound address (e.g., the phone number or short code), alternative endpoint identifiers (e.g., list of associated OTT services), carrier, origin properties, a cleanliness/quality score, capability properties (e.g., SMS, MMS, Fax, etc.), status (e.g., mobile, landline, client application type, toll free, etc.), screen resolution and display capabilities, language, service plan (e.g., do they get free SMS/MMS messages), activity patterns (e.g., when is the communication, who does the endpoint communicate with, what does the endpoint communicate, etc.), presence information for one or more routing options, and/or other suitable properties of a telephony endpoint. Origin properties can include NPs (e.g., area code), NXX (e.g., three digit vanity digits of a number), ISO country codes, region properties and/or any suitable origin properties. The records may include various sets of information depending on the information that is collected.

The information repository 130 is preferably updated with each OTT that registers or establishes a new connection with an endpoint. Preferably, a phone number is used as a primary endpoint identifier, an OTT entity will create associations between a user and phone numbers of a device.

2. Method for Enabling Multi-Modal Communication

Figure 2:
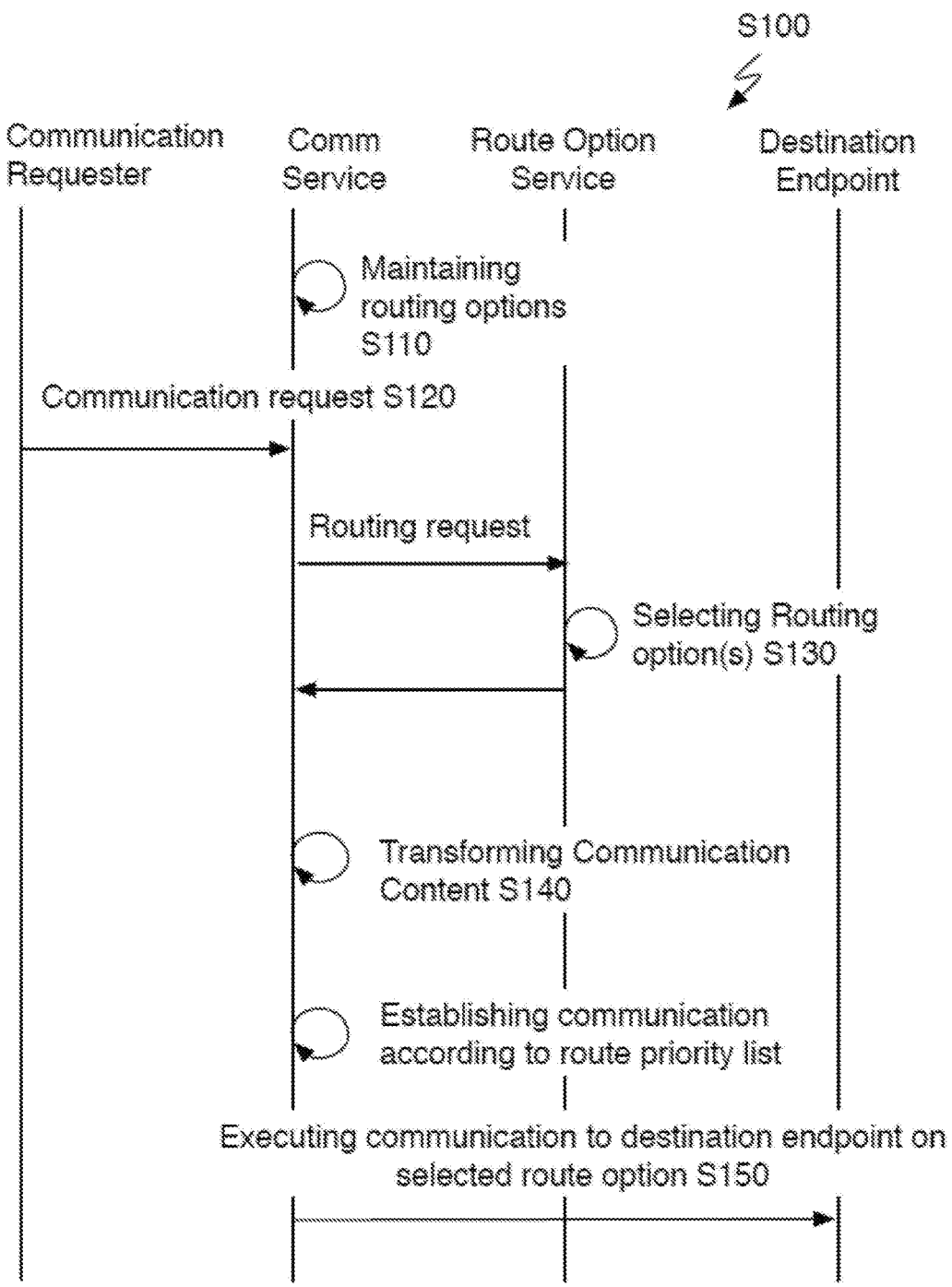
FIG. 2 is a communication flow diagram of a method sending an asynchronous message.
Figure 3:
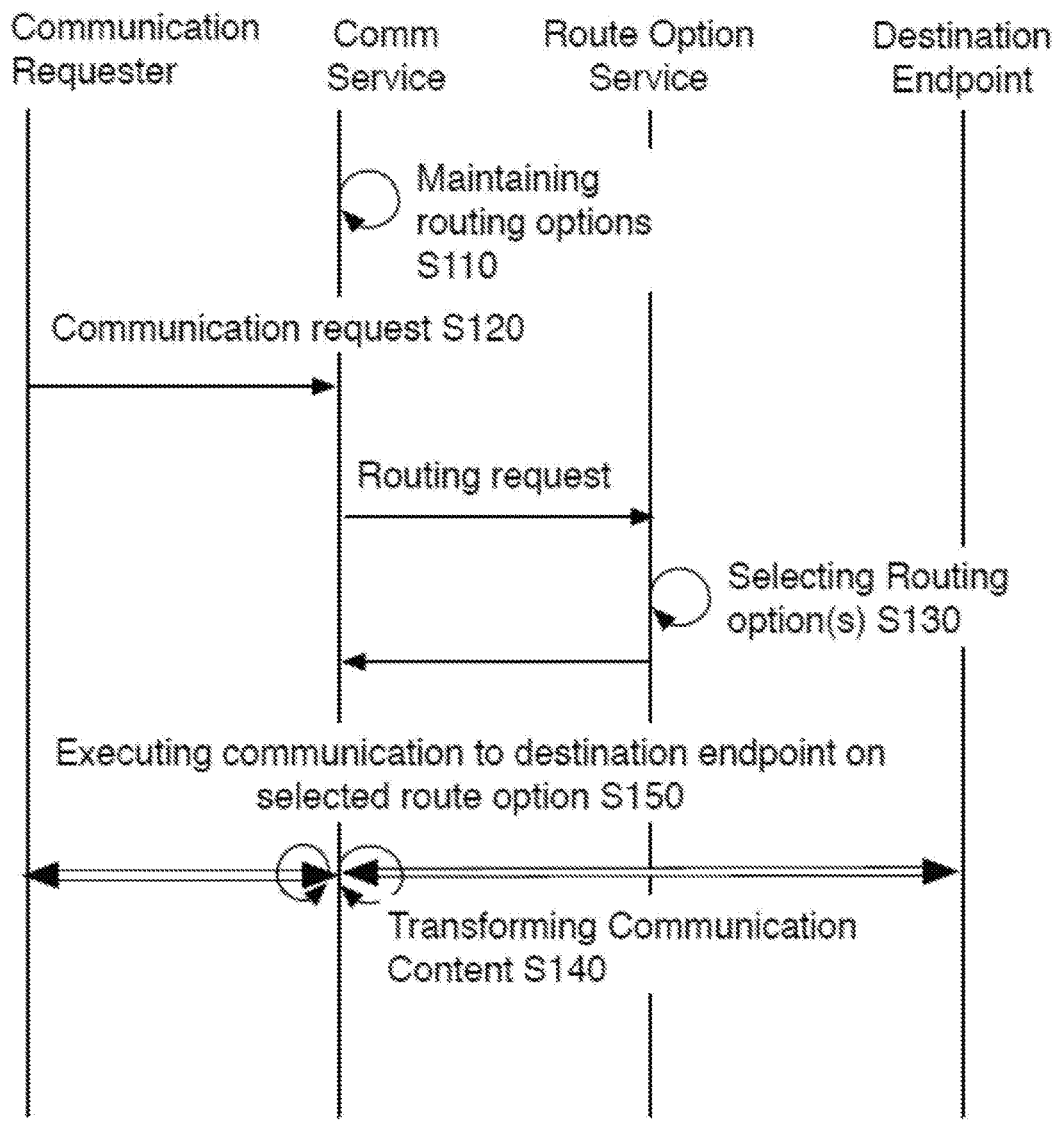
FIG. 3 is a communication flow diagram of a method establishing a synchronous communication session.

As shown in FIGS. 2 and 3, a method S100 for enabling multi-modal communication of a preferred embodiment can include maintaining routing options of at least two transport protocols S110, receiving a communication request S120, selecting routing option S130, transforming content of communication request to compatible form of the selected routing option S140, and transmitting content to a destination endpoint on the selected routing option S150. The method functions to normalize communication to be automatically communicate according to communication intent. The method can be used in transmitting an outbound communication, but is preferably implemented in two communication conversations/sessions so that responses to communications are similarly transformed to an appropriate transport protocol. The method is preferably used to unify communication across a plurality of communication protocols. Some exemplary communication transport protocols can include SMS, MMS, Fax, email, IP messaging, push notifications, PSTN voice, SIP voice, SIP video, IP based synchronous communication, and/or any suitable form of communication. As shown in FIG. 2, the method can be applied to asynchronous communication, but the method can additionally or alternatively be applied to asynchronous communication as shown in FIG. 3 or a hybrid of synchronous and asynchronous transport protocols. In addition to unifying modes of communication the method can unify different destination endpoints of a user.

In one implementation, the method is used by developers, applications, and services to express communication intentions, such as intended content of a message or intended mode of a communication session. For example, an application can specify an image and text that should be delivered to an endpoint. The method operates to deliver the content of the intended media, possibly transforming the final delivered format to conform to an appropriate mode of communication with the destination.

Block S110, which includes maintaining routing options of at least two transport protocols, functions to manage at least two different modes of communication. The modes of communication are preferably divided into multiple routing options. The routing options can include different transport protocols, but can additionally include different carriers, suppliers of a communication channel, regional routing options of a transport protocol, or any suitable route variation. Information relating to the routing options can be stored in a table or database of routing option profiles. The routing option profiles can be used in selecting preferred, optimal, or otherwise capable routing options when communicating.

Block S120, which includes receiving a communication request, functions to obtain an instruction for sending or establishing an outbound communication. The communication request is preferably received at a communication service, which as described can be a server or machine that establish a communication or at least direct a secondary service to establish a communication. The communication service may be specifically configured for a particular medium or mode of communication such as Public Switch Telephone Network (PSTN) calls, Session Initiation Protocol (SIP) voice or video calls, Short Message Service (SMS) messages, Multimedia Messaging Service (MMS) messages, IP based messaging, push notifications, proprietary communication protocols, and/or any suitable communication medium. The communication service may be used for a plurality of communication mediums. A communication request can include communication properties, which can include at least one destination endpoint, one originating endpoint, communication content, and/or other properties of the communication. The communication request can additionally include control properties such as a max price parameter, a quality limit, and/or other properties used to gate or control communication.

In one implementation, the communication request can indicate communication intent. As opposed to specific communication instructions (e.g., send a SMS message to this endpoint originating from this endpoint), the communication request can include intended communication content that indicates generalized objectives of the communication. The intended communication content can specify raw message content or medium of communication. In the case of asynchronous communication, the request of communication intent can include content intended for delivery and the intended destination entity. The final form of the content, whether the transmitted content is text, a graphic, a video, a link to an external resource, an audio message, and/or any suitable medium is not exclusively determined through the request as long as the content is delivered. Similarly, the exact destination endpoint is not strictly defined as long as the message is delivered to the intended entity. In the case of synchronous communication, the mode of communication can similarly be generalized. The communication request can include a specified mode of communication, which can place limits on the suitable routing options. The possible modes can include a voice session mode (where synchronous audio should be transmitted between at least two endpoints), a video session mode (where video and/or audio should be transmitted between at least two endpoints), and synchronous message transmission mode (where text, images, videos, and/or other media can be delivered to a destination). A voice session mode can result in a voice session (e.g., PSTN or SIP based), a video session with only audio, or any synchronous form of communication through which audio can be transmitted. A video session can be a video session or alternatively downgraded to just audio. An asynchronous message transmission mode can result in any executed communication that transmits desired content. Synchronous communication mediums can similarly be used when in an asynchronous message transmission mode.

Upon receiving a communication request, at least a subset of information from the communication request is sent to the routing service. Preferably, the subset of information sent to the routing service is sent in the form of a routing request. The subset of information includes communication properties specified in the communication request of block S110. Additionally, at least a subset of information from the communication request may be sent to a communication cost service. Preferably, the subset of information is sent to the communication cost service in the form of a cost request. The routing request and the cost request preferably include at least the destination of the communication. The routing request and/or cost request may additionally or alternatively include content of the communication, account information for the entity sending the communication request, the originating endpoint, the mode or medium of communication, and/or any suitable information. The routing request and the cost request are preferably sent in parallel but may alternatively be sent sequentially or in any suitable manner. The routing request and the cost request can be independent in that how a communication is routed and the attributed costs of that communication do not directly rely on each other. One expected benefit is that the quality of communication can be increased while simulating a simplified cost model to user accounts. As described below, a maximum cost parameter specified in a communication request can be accommodated after initially fulfilling the requests.

In one variation, the communication properties include a specified transport mode of communication. The specified transport mode can be a set of modes of communication permitted and/or blocked for the communication request. The set of operational transport modes can include a synchronous voice session mode of communication, a synchronous video session mode of communication, an asynchronous message transmission mode of communication and/or specific permitted/prohibited transport protocols (e.g., SMS, MMS, push, etc.). A specified transport mode can restrict, modify, or otherwise impact the selection of routing options.

Block S130, which includes selecting routing option, functions to determine a routing option of a communication. The communication request is preferably processed through a sequence of heuristics that can be used to select appropriate routing option. Selecting a routing option can include identifying one or more routing option capable of completing the communication request and identified according to a priority heuristic. In one variation, a single routing option is selected. In an alternative embodiment, a priority list of routing options is generated, and a routing option is selected from the list. The routing option is more specifically capable of completing the communication to a communication endpoint mapped to the specified destination endpoint. The specified endpoint may not be the receiving endpoint. A secondary endpoint associated with the specified endpoint may be targeted. For example, if a phone number is specified, but IP based messaging is instead used to communication with a username endpoint, wherein the user of the phone number operates the username endpoint.

In querying routing options, the intended communication content can be analyzed to identify suitable transport protocols. The routing options of suitable transport protocols can then be filtered according destination endpoint and intended content and/or intended mode of communication. A destination can be identified as including an associated carrier, a country/regional location property, and/or device capabilities. Routing options having been reduced to routings options capable of communication intended content and capable of delivering to the intended destination can then be further filtered according to availability. Some routing options can be suffering from down time or quality issues at any given time—such routing options are preferably not considered for selection.

Selection heuristics can consider many factors. The heuristics can consider content and mode of communication of a routing option, reliability of a routing option, feature capability of a routing option, urgency compliant features, price of communication, user presence information, user preference of communication, user history of communication, and/or any suitable factor that impacts an appropriate routing option.

A first heuristic can give weight to a routing option based on the involved content transformations. Different transport protocols can be given different preference depending on the original form of content. For example, sending a text message would give preference to a routing option involving an SMS with text over a routing option involving transforming the text to text-to-speech audio and playing over a PSTN phone call. The medium of intended content is preferably preserved, but the medium of content can be transformed depending on available routing options and/or other heuristic priorities.

A second heuristic can give weight to routing options according to quality scores, reliability, communication confirmation, and other suitable reliability and urgency compliance features. In one variation, a communication request can be accompanied by a TTL limit. The TTL limit can define a time window in which a message is delivered. Different routing options can have varying time to delivery predictions, and the routing option can be selected to satisfy the TTL restriction. Additionally, a communication request can include different confirmation requirements. A request may specify that an acknowledgment confirm the message was transmitted successfully or similarly that the message was read by the end user. Different transport protocols will have varying capabilities or mechanisms to provide such verification or acknowledgment. If a requested feature is not support by a routing option, that routing option may not be considered.

Figure 6:
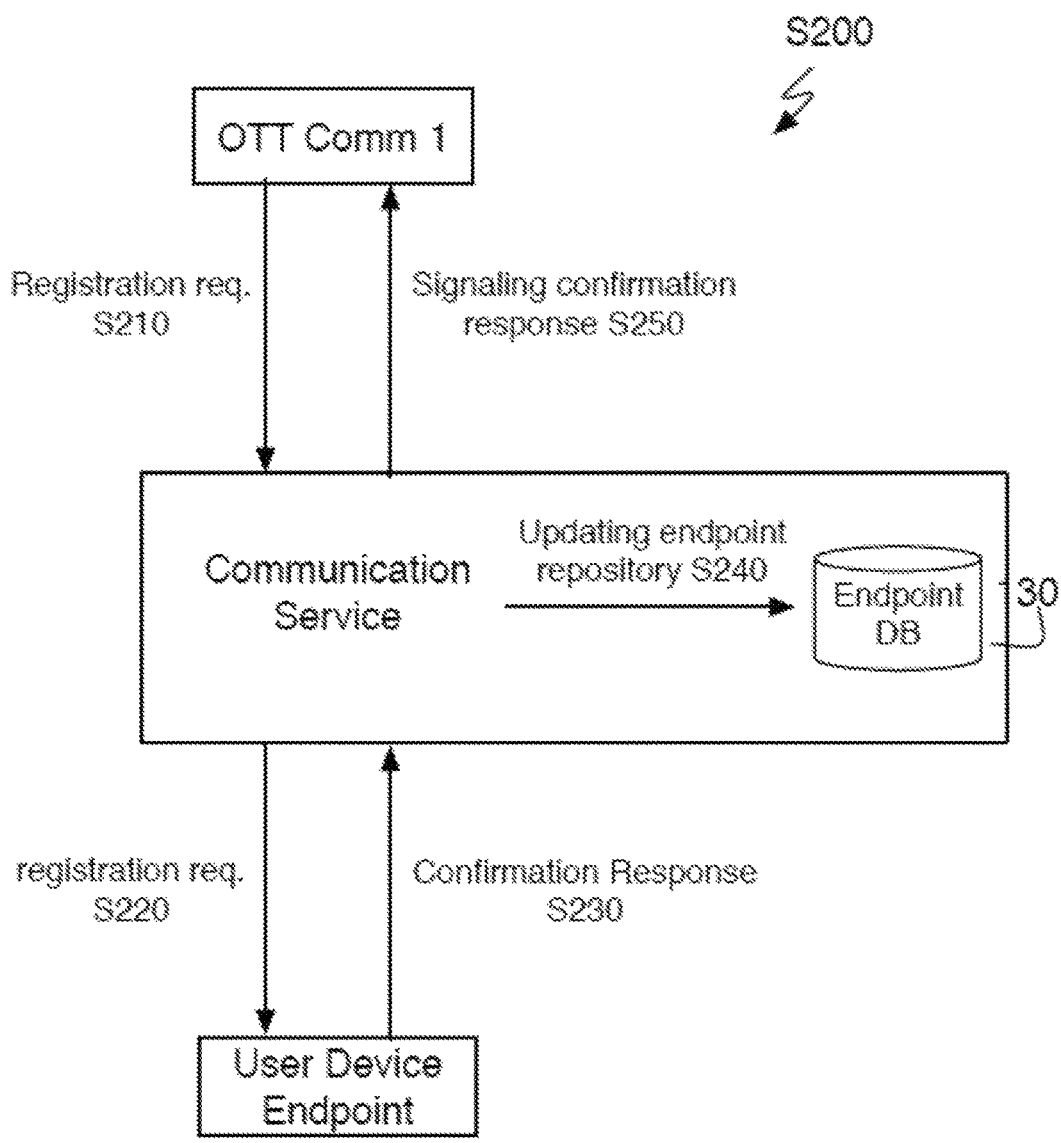
FIG. 6 is a schematic representation of a method for enrolling routing options of a preferred embodiment.

A third heuristic can give weight to routing options that have not satisfied a communication quota or contractual obligation. A quota can be set for a time frame, and a routing option has the target of satisfying the quota in that time frame. For example, an SMS routing option can have a quota of five thousand messages in a month. Selection of a routing option within a priority list or prioritization within the list can be based on satisfying the quota. For example, a routing option further from a quota can be prioritized above a routing option that has satisfied a quota, surpassed a quota, or does not include a quota as shown in FIG. 6. Additionally, a quota can be weighted to indicate importance of the quota. For example, some routing options may have a more important quota goal (e.g., a routing option will be cancelled by a carrier), and other routing options may have less important quota goal (e.g., special discounting pricing isn't provided if not satisfied). Various rules and properties can be encoded into a routing option to facilitate relative prioritization/selection of routing options. One exemplary use of a quota includes a routing option using a particular network carrier that was negotiated at an internal cost rate that has a minimum number of communications that should be met. Another exemplary use of a quota may include regulating a routing option with a rate limit of SMS messages sent in a minute allowed over a network carrier of a second routing option.

Figure 7:
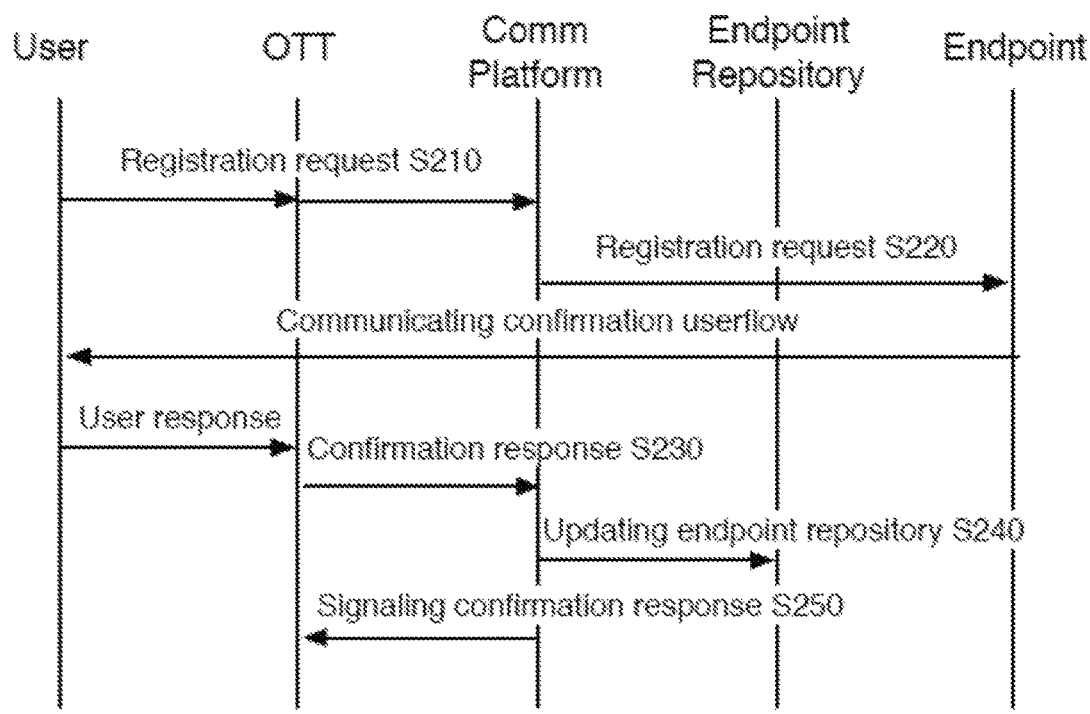
FIGS. 7 and 8 are communication flow diagrams of a method for enrolling routing options of a preferred embodiment.

A fourth heuristic can give weight to routing options with lower internal cost (e.g., payment to outside partners and/or operational cost). A related heuristic can include calculating effective internal cost of a routing option. The effective internal cost is the predicted cost to the communication cost to the platform. In some cases, communicating over a first transport protocol has different communication limits compared to a second transport protocol and as a result a routing option of the first transport protocol may require transmitting the intended content in one form (e.g., in a single message) and the routing option of the second transport protocol may require transmitting the intended content in a second form (e.g., split into two or more messages). The effective internal cost can be the number of messages to transmit the intended content multiplied by the internal cost of an individual message transmitted on the routing option as shown in FIG. 7. The cost can be a financial cost and is frequently dependent on the specific routing option. The difference between the communication cost and the effective internal cost can be the profit of the platform for an individual communication. The priority heuristic is preferably in place to increase profits across a plurality of communications.

A fifth heuristic can give weight to routing options with particular feature capabilities (e.g., message confirmation, no message size restrictions, multimedia support). A feature heuristic can be enforced if specified content specifies a desired delivered format.

A sixth heuristic can give considers presence information of the destination. A presence service can be integrated into the platform and provide availability of a user across multiple devices and/or protocols. For example, a user may be accessible through a phone voice session, SMS and MMS on the phone, push notifications on the phone, and through an IP protocol of an application on a second browser device. Presence information can indicate if any of those channels are active, prioritization/preference of the channels.

A seventh heuristic can consider communication history and/or destination preference. Preference of a destination can be inferred from communication. Modes of communication used to initiate outbound communication from an endpoint can be considered indicators of user preference. Alternatively, a user profile can be configured with prioritization of endpoints and/or protocols.

These factors and other suitable prioritization factors can be combined in any suitable manner to form a prioritization heuristic used in ranking routing options.

In one variation, selecting routing option can use an account defined routing profile that defines the prioritization of routing options. In the case of routing options including a plurality of different OTT services, there may be various business/competitive conflicts with using particular routing options. Defined routing profile tables can facilitate selecting and prioritizing routing options from the full set of routing options. While account-defined routing profiles may be one mechanism. Routing rules may additionally be automatically determined and applied. Endpoint-to-endpoint communication can be monitored and routing channel preference can be determined. In one variation, the preference can be monitored and determined on a per-endpoint basis. For example a first endpoint may prefer communicating with a second endpoint using one OTT service and communicating with a third endpoint using a second OTT service. In a simpler implementation, the previous mode of communication of an endpoint can be monitored and used as a default routing option.

Block S140, which includes transforming content of communication request to compatible form of the selected routing option, functions to convert media content of the communication to a format suitable for transmitting. In asynchronous communication, the content is converted and then transmitted to the destination. In synchronous communication, the content can be transcoded and streamed to a destination such that the content/medium is generated in substantially realtime with the communication session. The form of the transformation is determined based on the originating format of the communication content and the selected routing option. If the routing option is the same as the originating transport protocol, transformation of content may be skipped. Transformation can include translating to a text form, generating a URI link to the content, generating an audio version of the content, generating a video version of the content, satisfying protocol restrictions (e.g., character limits, file size limits, encoding, and the like), segmenting into multiple messages, grouping multiple content into a single object, supplying unspecified metadata, and/or making any suitable transformation. Exemplary transformations may include SMS to MMS, MMS to SMS, SMS/MMS to IP push/proprietary IP/client application, SMS/MMS to email/fax, fax/email to SMS/MMS, IP messaging to SMS/MMS, Voice to SMS, Voice to MMS, SMS to voice, Voice to video, Video to voice, and/or any suitable form of transformation.

Figure 4:
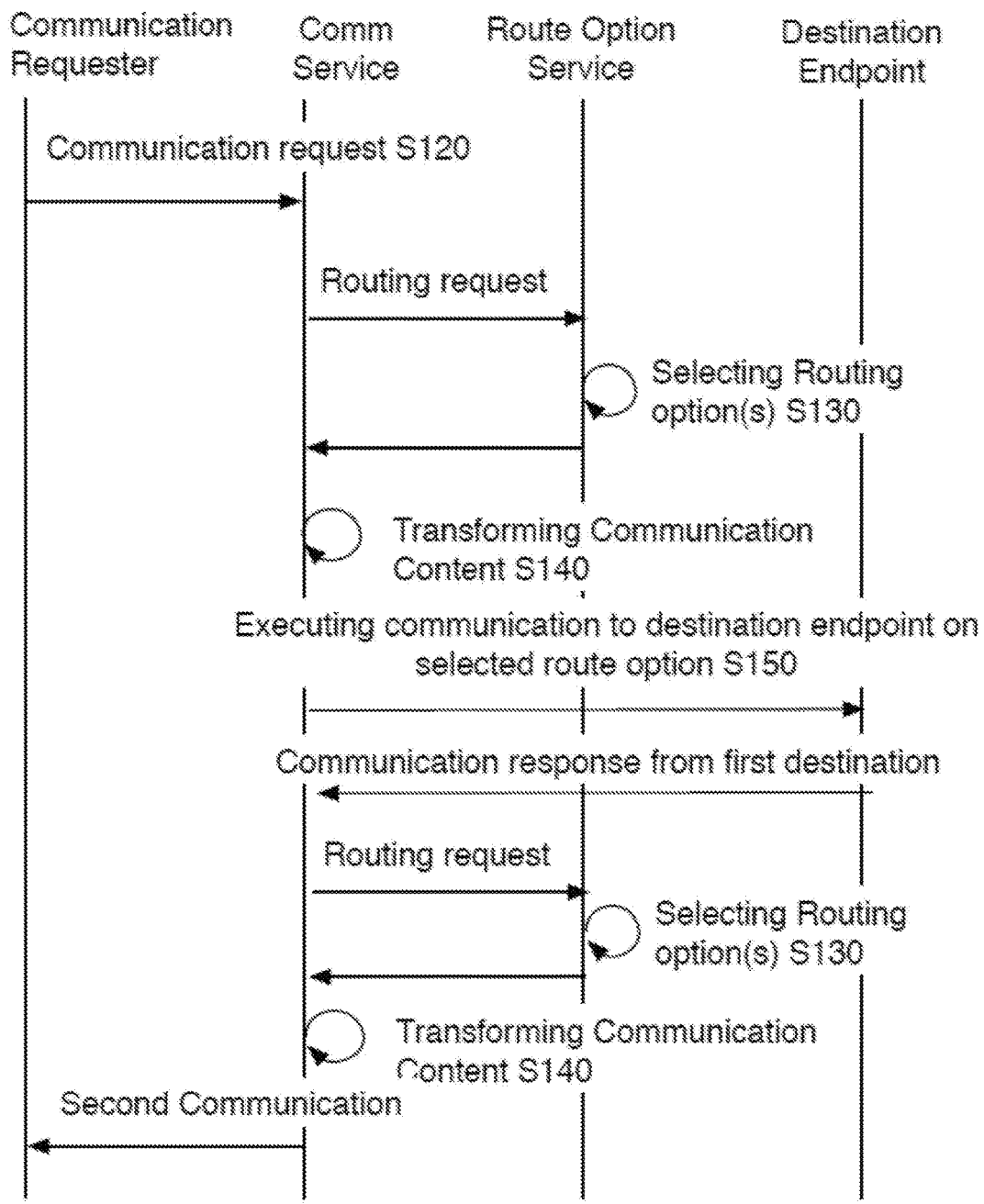
FIG. 4 is a communication flow diagram of a method enforcing an urgency parameter of a request.
Figure 5:
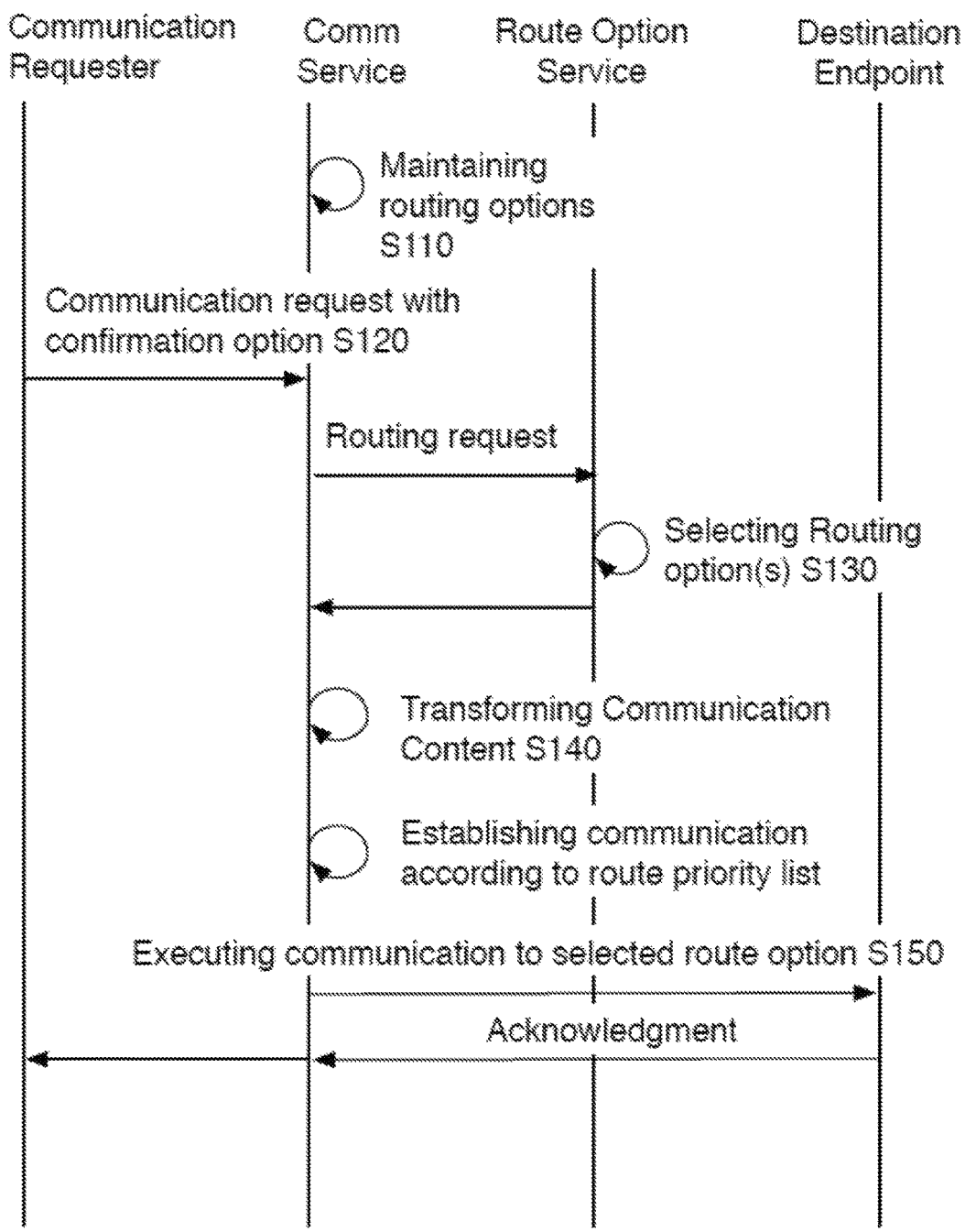
FIG. 5 is a communication flow diagram of a method for responding to responses from a destination.

Block S150, which includes transmitting content to a destination endpoint on the selected routing option, functions to establish or execute the communication. The communication is preferably implemented on the selected routing option using the transformed content. In some variations, communication confirmation of delivery or of reading can be requested. The delivery and reading request can be fulfilled through the transport protocol of the selected routing option. As shown in FIG. 4, an urgency parameter can specify that a receipt acknowledgment be made. Subsequent communications in asynchronous and synchronous forms of communication can be processed to select an appropriate routing option, optionally using communication history to influence routing option selection. In asynchronous communication (e.g., messaging), responses can be received from the delivery endpoint. A similar process can be invoked to determine the route used to deliver the response as shown in FIG. 5, but alternatively a routing option of the communication that prompted the initial communication response can be used. In synchronous communication, the destination endpoint can be bridged with the originating endpoint.

3. Method for Enrolling Routing Options in a Communication Platform

As shown in FIG. 6, a method S200 for enrolling routing option in a communication platform can include receiving a registration request of a communication provider directed at an endpoint S210, transmitting a registration communication to the endpoint S220, receiving confirmation response of the endpoint S230, updating an endpoint repository with the communication provider information S240, and signaling to the confirmation response to the communication provider S250. The method functions to allow an OTT communication entity to register and verify an endpoint to associate with an account on the OTT. The OTT entity will preferably trigger the method when a user is registering for an account or pairing a new device to an account. After the new device is paired through the method, the OTT entity can use the additional endpoint as an additional communication option. While phone numbers may be useable as a uniform endpoint address for different modes of communication such as PSTN, SMS, MMS, and fax, OTT account identifiers exist within the ecosystem of the OTT. As OTT providers become more widely user, the communication environment can become fragmented. The method provides a common layer for OTT entities to manage the integration of multiple OTTs. The method is preferably used continually for a variety of endpoints, and eventually the method can achieve a relationship graph of endpoints and OTT providers. The method S200 can be used with the method S100 above to facilitate multi-modal routing and leveraging the addition and integration of OTT routing options with other modes of communication. In one variation, a benefit of the method can include providing endpoint information. In another variation, a benefit can provide additional measures of device verification. In another variation, the endpoint repository can be used in augmenting multi-modal or selective mode of communication.

Block S210, which includes receiving a registration request of a communication provider directed at an endpoint, functions to be prompted by an OTT provider to register an endpoint on behalf of the OTT provider. Preferably, the communication platform includes an API that includes one or more calls that facilitate requesting the registration of an endpoint. The registration request preferably includes a specified destination address to be registered. The destination address is preferably a phone number, but the destination address may alternatively by an account identifier, a username, an email address, or any suitable endpoint address. The registration address may additionally include a unique identifier within the scope of the provider, which functions to provide a mechanism for specifying an account associated within the system of the OTT provider. The registration request is preferably made on behalf of some user of the OTT service. The provider unique identifier can be a username, and email address, a random alphanumeric. The provider unique identifier can add an alternative way of specifying the platform endpoint. A provider unique identifier may not be provided and the existing endpoint identifier. For example, the phone number in combination with the name of the OTT provider can be used as a proxy for a provider unique identifier of the endpoint.

The registration request preferably additionally includes account information. The account information can include authentication token(s), an account identifier, OTT identifier, or any suitable source information. The OTT will preferably initiate the registration API call when a customer attempts to pair a phone number or other communication endpoint with an account on the OTT. For example, within an account page on an OTT provider, a user can enter a phone number and submit the number. The OTT provider will preferably send the API request to the communication platform to complete the registration. From the user standpoint, the communication platform is transparent. After submitting the phone number, the user will preferably receive a communication on his or her phone, which the user will be able confirm. The communication platform can alternatively provide alternative interfaces to the OTT providers. For example, an embeddable UI can be provided for facilitating registration user interface. The UI can be embedded in the OTT website or application (e.g., as an iframe) to facilitate receiving registration.

Block S220, which includes transmitting a registration communication to the endpoint, functions to deliver a message or communicate with the endpoint. Preferably the communication platform has at least one routing option available for routing to the destination endpoint. In the variation where the destination endpoint is a phone number, a SMS or MMS message can be delivered to the device. Alternatively, an automated voice call can be delivered over PSTN, SIP, or an alternative VoIP communication protocol (e.g., WebRTC). The registration communication preferably includes a code or an alternative identifier. In one variation, the registration communication will include a 6 digit pin that can be entered within an application, website, or any suitable interface. The entering of the pin codes signals successful delivery of the registration communication and that the owner of the endpoint is confirming the registration. In another variation, the registration communication includes a unique URI. When the delivered, the user can click the link to confirm the registration. Since the URI is unique, access of the resource can signal confirmation of the registration. Alternatively, the URI may display options to confirm or deny the registration. In another variation, the registration communication is a message specifying response options. The message could be a text message, an image, a video, or any suitable media message. In another variation, transmitting a registration communication includes making a voice or video call. The voice or video call can be used to receive confirmation or some form of a response during the call (e.g., through DTMF or voice recognition).

Block S230, which includes receiving confirmation response of the endpoint, functions to determine the results of the registration with the endpoint. The confirmation response preferably includes confirmation of pairing the endpoint with the OTT. The user will preferably be expecting the communication and will know that confirming will complete the process. In one variation, the confirmation response is received in response to the registration communication from the destination endpoint. For example, the conformation response is an SMS or MMS message reply. The message reply can include a response such as "YES" or "NO" to indicate if the endpoint should or should not be registered in association with the request. The confirmation response may alternatively be made during the registration communication if the registration communication is a synchronous communication. In the variation where a pincode is entered in an interface, the interface could be one created and provided by the OTT provider or any suitable outside provider. An API call is preferably provided to inform the communication platform of the user response. The OTT provider (or outside provider) can use the API call to inform the communication platform.

The method can additionally include verifying a device through an endpoint repository, which functions to use existing endpoint information to add an additional layer in registration. The OTT provider may not have access to information outside of their own platform, but the multi-modal communication aspect of the communication platform can enable insights to be pulled from previous registrations and/or communications. The communication platform will preferably retain information about various endpoints in the endpoint repository. In some cases an endpoint may already be registered with other OTT entities or otherwise be known within the communication platform due to prior communication interactions. The past history of a known endpoint can be used in confirming registration. In one variation, automatic verification of a destination endpoint may be enabled if the endpoint is already confirmed through another OTT. In another variation, the verifying of the device may use fraud detection heuristics or other triggers to prevent confirmation of the registration.

Block S240, which includes updating an endpoint repository with the communication provider information, functions to record the registration of an endpoint with a new OTT entity. The endpoint repository will preferably include a set of records for different endpoints. Each endpoint will preferably include a parameter or parameters that define the set of routing options. The set of routing options preferably include the OTT entities that have registered with the endpoint. An OTT registration can indicate that the user of the endpoint has paired an account of the OTT with the phone. In some situations, this registration can be a signal that an application of the OTT is used by the user or at least has been used by the user.

The endpoint repository is additionally used beyond just registration but in facilitating and tracking communication through the OTT entity. The endpoint repository can be updated and maintained to signal different aspects of the endpoint and related OTT entities and other routing options. Preferably the endpoint repository will store information relating to the history of each OTT entity such as a registration timestamp, time of last communication through the OTT entity on the communication platform, preference rating of an OTT entity (e.g., order ranking of OTT entities or routing options according to frequency of use). The endpoint repository can additionally be used in synchronizing changes amongst OTT entities. In one variation, a change of registration of one OTT entity may be applied to other OTT registrations. For example, if a user gets a new phone number and updates the registration for a first OTT provider, then the method may include notifying a second OTT provider previously registered of the phone number change, automatically migrating the updated number for the second OTT provider, invalidating the registration of the second OTT provider until re-registered, and/or any suitable action.

Figure 8:
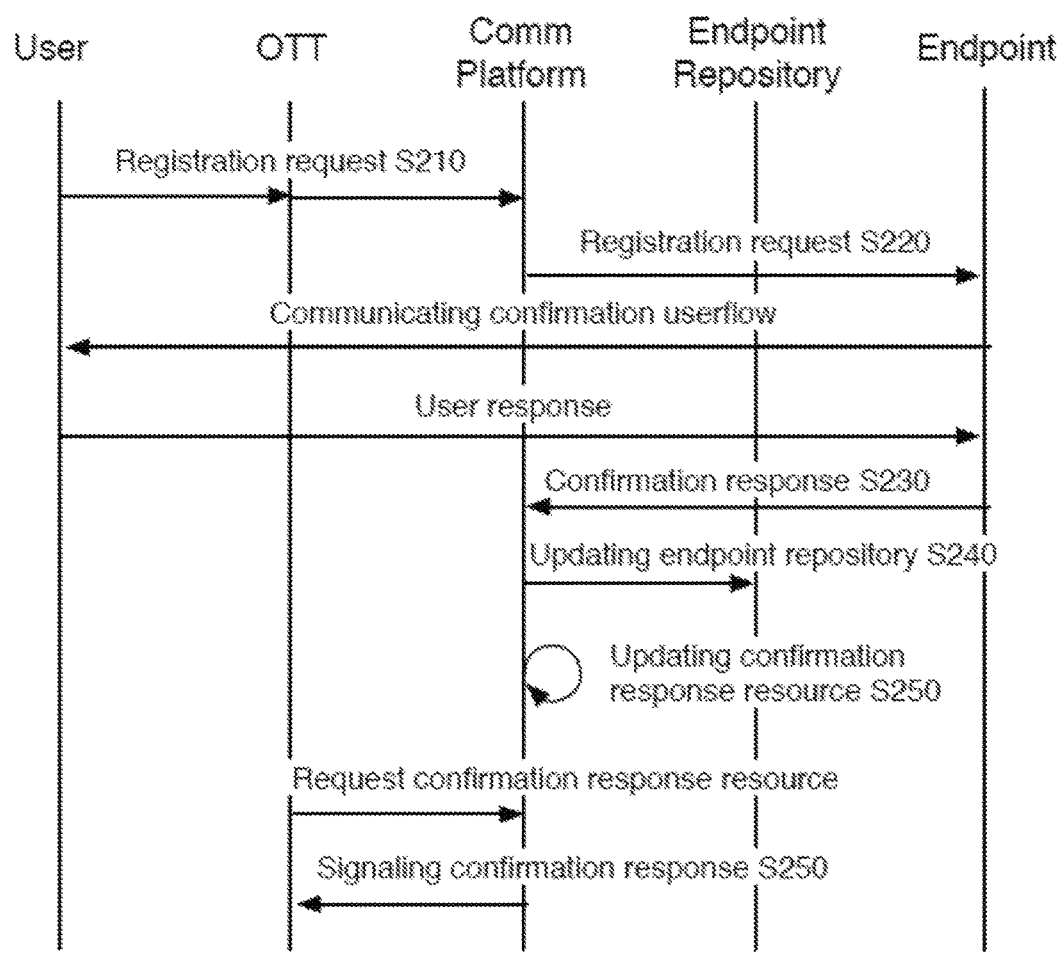

Block S250, which includes signaling the confirmation response to the communication provider, functions to update the communication provider of the registration result. The signaling of the confirmation response preferably includes a confirmation that the endpoint successfully completed registration or that the registration was not successfully confirmed. Unsuccessful confirmation may simply be a denial of registration, but the denial or error response may additionally include a reason such as cancelation (e.g., user changes his mind) or fraud reporting (e.g., user did not initiate the registration and flags the request). The signaling can be performed in a variety of approaches. In a first variation, the confirmation response is included in a response to the registration request API call as shown in FIG. 7. In another variation, the confirmation response is posted or submitted to a specified resource of the OTT provider. In yet another variation, a resource in the communication platform is updated, and the OTT provider can poll the resource to obtain the status as shown in FIG. 8. For example, the registration request API call may trigger a response from the communication platform that includes a resource identifier (e.g., a URI). The OTT entity can poll the resource identifier until the confirmation response is obtained. Prior to receiving a confirmation response, the resource identifier can return a 'pending' response or an alternative response to indicate that the registration process is still in progress.

The method can additionally include providing endpoint information of the endpoint repository, which functions to enable access, use, and interaction with the endpoint repository. Providing endpoint information preferably includes providing API access to at least a portion of the information of the endpoint repository. The API access preferably includes public API access that is usable by customers/users. The API access may alternatively or additionally be private used within the communication platform. In one variation, an API call can query a specific endpoint and retrieve information about OTT registration with the number. As discussed above, the usage relating to each OTT may additionally be accessible. A portion of the API may be opened publically so that any entity can check if a particular endpoint is registered with a specific OTT entity. In another variation, some or all the information may be limited to OTT associated accounts in the communication platform. The OTT entity can have a special account set up (e.g., the account used to submit the registration requests). In one variation, the OTT entity can query all the phone numbers registered for the OTT entity. After registration, an OTT entity can additionally update registration such as canceling/terminating registration.

4. Multi-Tenant Communication Platform

Figure 9:
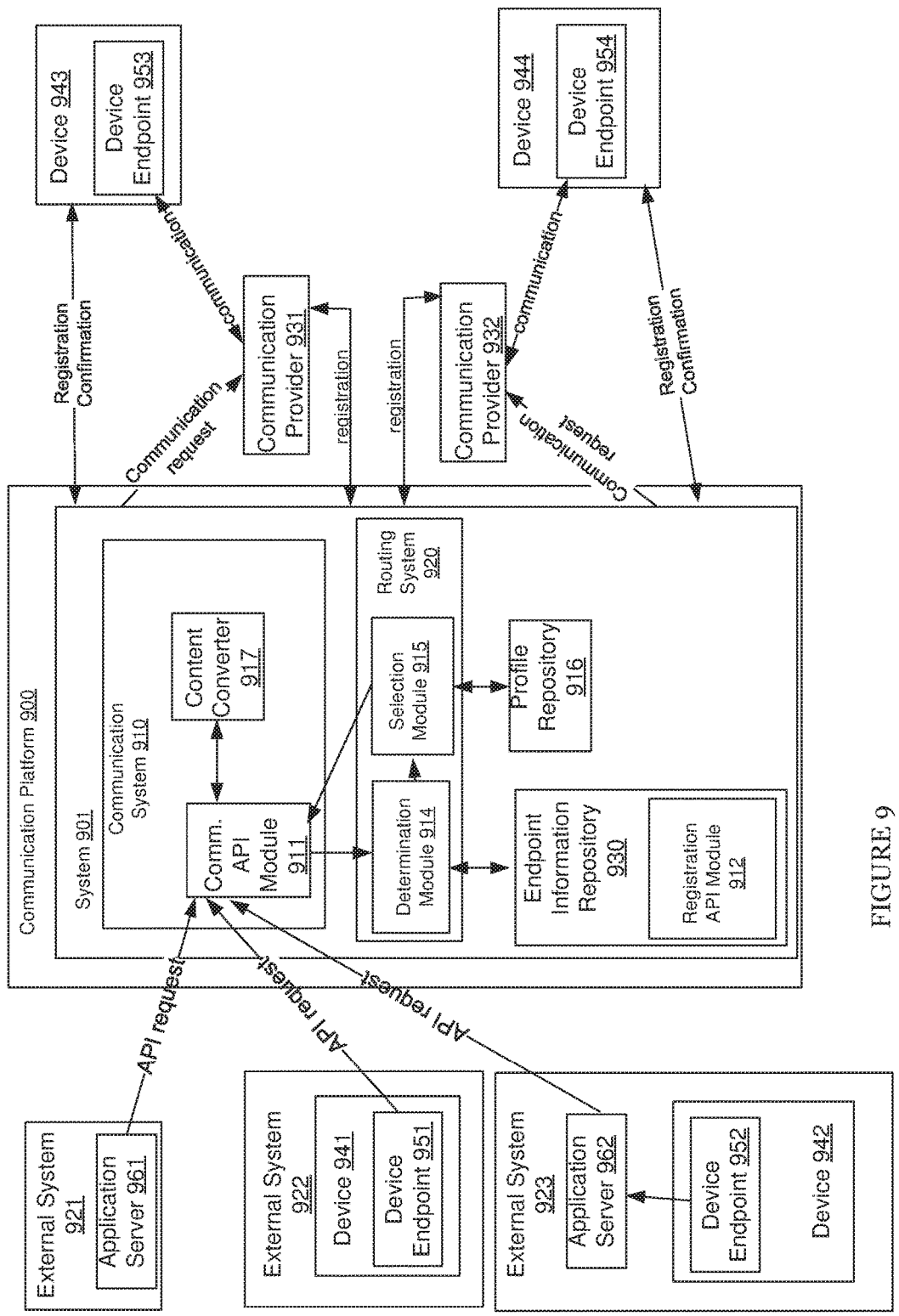
FIG. 9 is a schematic representation of an embodiment.

As shown in FIG. 9, a multitenant communication platform 900 includes a system 901 for enabling multi-modal communication. In some embodiments, the system 901 includes a communication system 910, a routing system 920, and an endpoint information repository 930. In some embodiments, the system 901 includes a communication profile repository 916.

In some implementations, the communication system 910 includes a communication API module 911 and a content converter 917. In some implementations, the content converter 917 is similar to the content converter 114 of FIG. 1.

In some implementations, the routing system 920 includes a routing address record determination module 914 and a communication provider selection module 915.

In some implementations, the endpoint information repository includes a registration API module 912.

As shown in FIG. 9, the communication platform 900 is communicatively coupled with external systems 921, 922 and 923, communications providers 931 and 932, and devices 943 and 944. The device 943 includes a device endpoint 953, and the device 944 includes a device endpoint 954. The external system 921 includes an application server 961. The external system 922 includes a device 941 that has a device endpoint 951. The external system 923 includes an application server 962 and a device 942, and the device 942 includes a device endpoint 952. The device 942 is communicatively coupled with the application server 962.

In some implementations, the communication system 910 is similar to the communication system 110 of FIG. 1, the routing system 920 is similar to the routing system 120 of FIG. 1, and the endpoint information repository 930 is similar to the endpoint information repository 130 of FIG. 1.

The multitenant communication platform 900 provides communication services to developer applications and services. In some implementations, the communication platform 900 is a telephony platform such as the one described in patent application Ser. No. 12/417,630 filed 2 Apr. 2009, entitled "System and Method for Processing Telephony Sessions", which is hereby incorporated in its entirety by this reference. The telephony platform preferably includes application execution in connection to communications sessions and/or messages; the telephony platform may additionally or alternatively provide an application programming interface (API) as an alternative for interacting with communication functionality of the telephony platform. The telephony platform is preferably a multitenant telephony platform that allows multiple accounts to configure telephony applications for use on the platform. The telephony can be designed for one or more mediums of communication. The telephony platform can additionally be a cloud hosted platform as a service system. The telephony platform can be a server, a server cluster, a collection of components on a distributed computing system, or any suitable network accessible computing infrastructure.

In some implementations, the system 901 is used in combination with a text or multi-media based messaging system, a video or voice chat system, a screensharing system, and/or any suitable communication platform.

Multi-Tenant

The communication platform 900 is multitenant meaning that the communication platform 900 can be used for the processing of communication requests for accounts (of the communication platform 900) for a plurality of external systems.

Components

As shown in FIG. 9, the system 901 includes the following components: the communication system 910, the routing system 920, the endpoint information repository 930, the profile repository 916, the communication API module 911, the content converter 917, the routing address record determination module 914, the communication provider selection module 915, and the registration API module 912.

In the example embodiment of FIG. 9, the components (e.g., 910, 920, 930, 911, 912, 914, 915, 916, and 917 of FIG. 9) include instructions that are executed by any combination of one or more processing units. In the example embodiment, each processing unit includes one or more processors communicatively coupled to one or more of a RAM, ROM, and machine-readable storage medium; the one or more processors of the processing unit receive instructions stored by the one or more of a RAM, ROM, and machine-readable storage medium via a bus; and the one or more processors execute the received instructions. In some embodiments, the processing unit is an ASIC (Application-Specific Integrated Circuit). In some embodiments, the processing unit is a SoC (System-on-Chip). In some embodiments, one processing unit includes the components of the system 901. In some embodiments, a plurality of processing units include the components of the system 901. In some embodiments, the one or more processing units are included in one or more server devices.

5. Method for a Multi-Tenant Communication Platform

Figure 10:
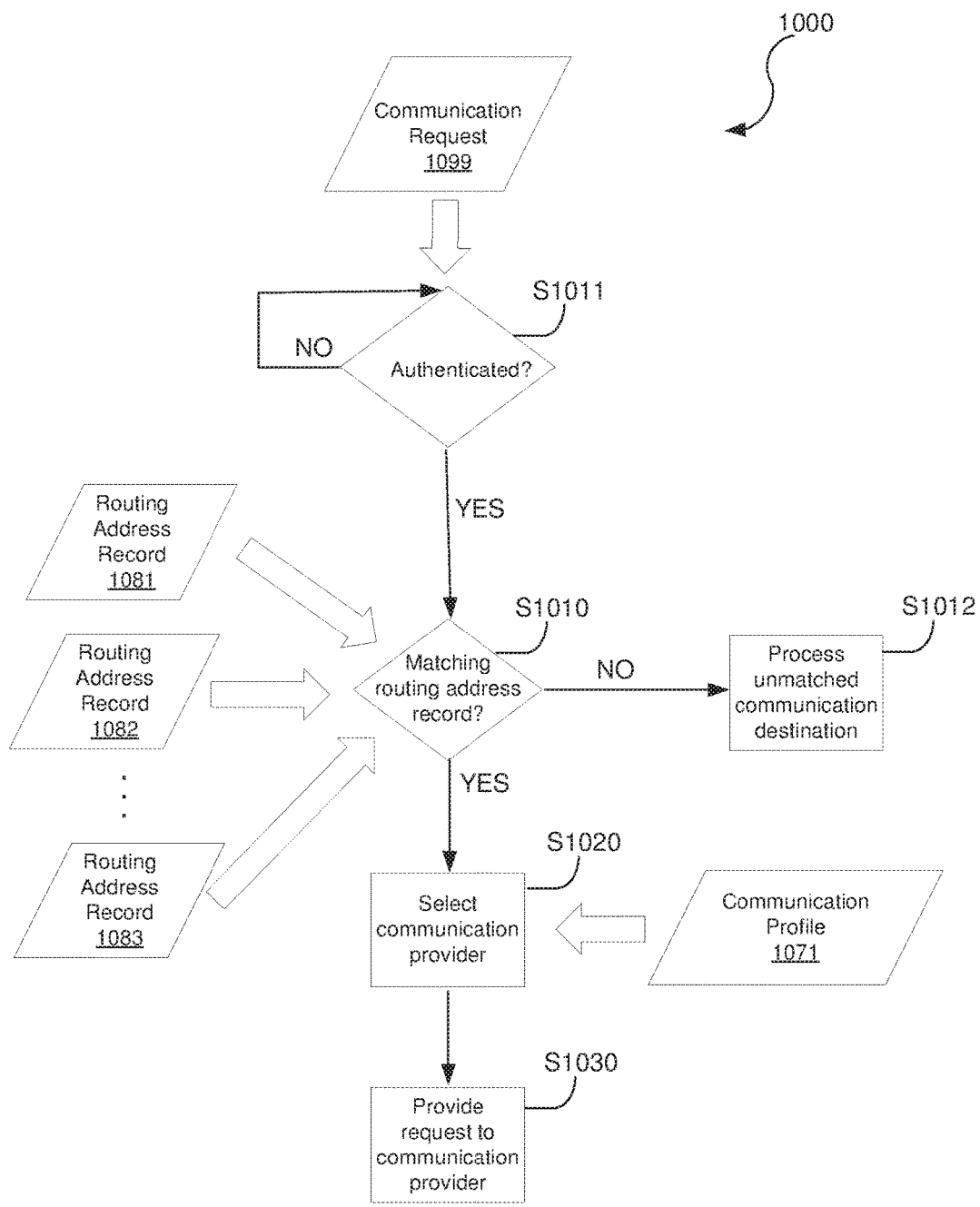
FIG. 10 is a chart view of a method of an embodiment.

As shown in FIG. 10, a method 1000 for a multi-tenant communication platform (e.g., 900 of FIG. 9) in accordance with an example embodiment includes, at a multi-tenant communication platform, and responsive to authentication of a communication request (e.g., 1099 of FIG. 10) provided by an external system (e.g., external systems 921-923 of FIG. 9), the communication request specifying a communication destination and account information: determining a routing address record (e.g., the routing address records 1081-1083) of the communication platform that matches the communication destination of the communication request, the matching routing address record associating the communication destination with a plurality of external communication providers (e.g., the communication providers 931 and 932 of FIG. 9) (process S1010); selecting at least one communication provider associated with the matching routing address record (process S1020); and providing a request to establish communication with the communication destination to each selected communication provider (process S1030).

In the example embodiment of FIG. 10, the method of FIG. 10 is implemented in the multi-tenant communication platform 900 of FIG. 9. In some implementations, the communication system 910 performs the processes S1011 and S1030, and the routing system 920 performs the processes S1010, S1020 and S1012. In some embodiments, the method of FIG. 10 is implemented in any suitable type of multi-tenant communication platform.

In some implementations, each communication provider includes at least one of an SMS service provider, MMS service provider, push notification service provider, IP messaging service provider, proprietary third party OTT messaging service provider, proprietary third party OTT communication service provider, PSTN service provider, SIP voice service provider, Video communication service provider, screensharing service provider, fax service provider, and email service provider.

Process S1010, which includes determining a routing address record of the communication platform that matches the communication destination of the communication request, is performed responsive to process S1011 ("YES" at S1011 of FIG. 10), which functions to authenticate a communication request (e.g., the communication request 1099 of FIG. 10) provided by an external system (e.g., one of the external systems 921, 922 and 923 of FIG. 9). In some embodiments, the communication request (e.g., the communication request 1099) specifies a communication destination and account information.

In some implementations, the account information includes an account identifier of the external system and an authentication token associated with the account identifier. In some implementations, authentication of the communication request includes authenticating the communication request by using the authentication token, and determining that the communication request is permitted for an account identified by the account identifier. In some implementations, a communication system of the communication platform 900 (e.g., the communication system 910 of FIG. 9) performs the authentication of the communication request.

In some implementations, in a case where the communication request is not authenticated, the communication request is denied ("NO" at process S1011). In some implementations, the communication request is not authenticated if authentication conditions are not satisfied. In some implementations, authentication conditions include at least one of the authentication token being valid, the communication request being permitted for the account identified by the account identifier (e.g., as specified by account permissions stored at the communication platform 900), the authentication token being a valid authentication token for the account identifier, and the communication request being a valid communication request. In some implementations, in a case where the communication request is not authenticated ("NO" at process S1011), the communication platform 900 provides the external system with a notification that the communication request has been denied.

Process S1010, which includes determining a routing address record of the communication platform that matches the communication destination of the communication request, functions to control the communication system 901 (of FIG. 9) to determine the matching routing address record from among a plurality of routing address records (e.g., the routing address records 1081-1083 of FIG. 10) stored at the communication platform 900 in an endpoint information repository (e.g., the endpoint information repository 930 of FIG. 9).

In some implementations, each routing address record stored at the communication platform 900 associates a communication destination with at least one external communication provider. In some implementations, each routing address record stored at the communication platform 900 associates a communication destination with a plurality of external communication providers. In some implementations, at least one routing address record stored at the communication platform 900 associates a communication destination with a plurality of external communication providers.

In some implementations, at least one of a routing address identifier and a deterministic endpoint address specified in a routing address record associates the routing address record with a communication destination. In some implementations, deterministic endpoint addresses include at least one of a phone number, an email address, an IP address, and an account identifier of a communication provider. In some implementations, communication destinations include at least one of a phone number, an email address, an IP address, and an account identifier of a communication provider In some implementations, a routing address identifier includes at least one of a phone number prefix (e.g., "(415) 555-XXXX"), an e-mail domain (e.g., "@domain.com"), and the like. In some implementations, a routing address record specifying a routing address identifier is associated with all communication destinations that match the routing address identifier (e.g., a prefix of the communication destination matches the routing address identifier). In some implementations, a routing address record specifying a deterministic endpoint address is associated with the communication destination that matches the deterministic endpoint address (e.g., the communication destination is specified in the routing address record).

In some implementations, each communication provider (e.g., the communication providers 931 and 932 of FIG. 9) specified in a routing address record of the communication platform 900 is a communication provider that has registered with the communication platform 900 (e.g., as described below for FIGS. 11A and 11B).

In some implementations, each communication provider specified in a routing address record (of the platform 900) that specifies a deterministic endpoint address is a communication provider that has registered with the communication platform 900 for the communication destination and that has been confirmed by a device endpoint (e.g., the device endpoints 951-954 of FIG. 9) associated with the communication destination (e.g., as described below for FIGS. 11A and 11B).

In some implementations, each routing address record stored at the communication platform 900 is one of a global routing address record and an account routing address record. Each account routing address record specifies an account identifier for an account of the communication platform 900.

In some implementations, determining the matching routing address record from among the plurality of routing address records stored in the endpoint information repository includes: accessing the plurality of routing address records (e.g., the routing address records 1081-1083 of FIG. 10) stored in the endpoint information repository (e.g., 930 of FIG. 9), and for each accessed routing address record, determining whether the routing address record matches the communication destination and the account identifier (of the account information) of the communication request (e.g., the communication request 1099 of FIG. 10). In some implementations, in a case where a routing address record that matches both of the communication destination and the account identifier is not identified, then a determination is made as to whether a global routing address record that matches the communication destination is stored at the communication platform 900.

In some implementations, determining the matching routing address record from among the plurality of routing address records stored in the endpoint information repository includes: accessing the plurality of routing address records (e.g., the routing address records 1081-1083 of FIG. 10) stored in the endpoint information repository (e.g., 930 of FIG. 9), and for each accessed routing address record, determining whether the routing address record matches the communication destination of the communication request (e.g., the communication request 1099 of FIG. 10). In a case where the routing address record specifies a routing address identifier, a determination is made as to whether the routing address identifier matches the communication destination. In a case where the routing address record specifies a deterministic endpoint address, a determination is made as to whether the communication destination that matches the deterministic endpoint address (e.g., the communication destination is specified in the routing address record).

In some implementations, determining the matching routing address record from among the plurality of routing address records stored in the endpoint information repository includes: first determining whether at least one routing address record exists that specifies a deterministic endpoint address that matches the communication destination. In a case where a routing address record that specifies a deterministic endpoint address that matches the communication destination is not identified, a second determination is made as to whether a routing address record exists that specifies a routing address identifier that matches the communication destination.

In some implementations, determining the matching routing address record from among the plurality of routing address records stored in the endpoint information repository includes: accessing the plurality of routing address records (e.g., the routing address records 1081-1083 of FIG. 10) stored in the endpoint information repository (e.g., 930 of FIG. 9), and determining routing address records that specify a deterministic endpoint address. For each routing address record that specifies a deterministic endpoint address, a determination is made as to whether the deterministic endpoint address matches the communication destination of the communication request (e.g., the communication request 1099 of FIG. 10). In a case where a matching routing address record that specifies a deterministic endpoint address is not determined, routing address records that specify a routing address identifier are identified from among the stored routing address records. For each routing address record that specifies a routing address identifier, a determination is made as to whether the routing address identifier matches the communication destination of the communication request.

In some implementations, in a case where a matching routing address record is not determined ("NO" at S1010), the communication request having the unmatched communication destination is processed by performing at least one of error handling and default routing (process S1012). In some implementations, in a case where a matching routing address record is not determined ("NO" at S1010), the communication platform 900 provides the external system with a notification that the communication request has been denied. In some implementations, in a case where a matching routing address record is not determined ("NO" at S1010), the communication platform 900 selects a default communication provider and proceeds to the process S1030 which includes providing a request to establish communication with the communication destination to the default communication provider, in a manner described below for the process S1030 of FIG. 10. In some implementations, in a case where a matching routing address record is not determined ("NO" at S1010), the communication platform 900 determines a plurality of default communication providers, and processing proceeds to the process S1020 which includes selecting at least one communication provider from the plurality of default communication providers, in a manner described below for the process S1020 of FIG. 10.

Process 1020 is performed responsive to determination of a routing address record of the communication platform that matches the communication destination of the communication request ("YES" at S1010). In some implementations, process 1020 is performed responsive to determination of a routing address record that matches the communication destination and that is associated with a plurality of communication providers. In some implementations, in a case where the matching routing address record determined at the process S1020 is associated with one communication provider, the process 1020 is not performed.

Process S1020, which includes selecting at least one communication provider associated with the matching routing address record, functions to control the routing system 920 to select at least one communication provider specified in the matching routing address record. In some implementations, selection of at least one communication provider specified in the matching routing address record is performed based on a communication profile. In some implementations, selection of at least one communication provider specified in the matching routing address record is performed based on a communication profile in a case where the matching routing address record specifies a plurality of communication providers.

In some implementations, the communication profile is at least one of a global communication profile and an account communication profile that is associated with the account identifier that identifies an account at the communication platform 900 that is associated with the external system. In some implementations, the account communication profile is generated based on the communication request (e.g., the communication request 1099 of FIG. 10). In some implementations, the account communication profile is included in the communication request (e.g., the communication request 1099 of FIG. 10). In some implementations, the account communication profile is generated based on an API of the communication platform 900 (e.g., an API of the communication API module 911, an API of the profile repository 916 of FIG. 9, and the like). In some implementations, the account communication profile is provided via an API of the communication platform 900 (e.g., an API of the communication API module 911, an API of the profile repository 916 of FIG. 9, and the like).

In some implementations, selection of at least one communication provider specified in the matching routing address record includes accessing a communication profile stored in the profile repository 916 of FIG. 9, and using the accessed communication profile to select the at least one communication provider. In some implementations, accessing a communication profile stored in the profile repository 916 includes: determining whether the profile repository includes an account communication profile that specifies the communication platform 900 account identifier of the external system that is provided in the communication request (e.g., 1099 of FIG. 10); in a case where the profile repository 916 includes an account communication profile that specifies the account identifier of the external system, the account communication profile is used to select the at least one communication provider; and in a case where the repository 916 does not include an account communication profile that specifies the account identifier of the external system, a global communication profile of the platform 900 is used to select the at least one communication provider.

In some implementations, selection of at least one communication provider specified in the matching routing address record includes accessing an account communication profile from the communication request (e.g., 1099), and using the accessed account communication profile to select the at least one communication provider.

In some implementations, the communication profile specifies at least a priority and a weight for at least one communication provider. In some implementations, the priority and weight for each communication provider specified in the communication profile are used during selection of one or more communication providers from communication providers specified in the matching routing address record.

In some embodiments, the communication profile specifies parameters associated with the different communication providers, such as quality score, regional associations (e.g., related country codes or area codes or geographic proximity), quota prioritizations, internal cost (e.g., cost to the platform), effective internal cost (e.g., cost to transmit requested content considering transforming the content into multiple messages), and/or any suitable parameter used in selecting a communication provider.

In some embodiments, the quota prioritization parameter is used to prioritize a communication provider in response to a contractual obligation. Some communication providers can be maintained through contractual obligations of meeting a quota of communications (e.g., number of calls, number of messages, rate of communication). This quota prioritization parameter can be dynamically updated or fixed based on the communication restriction. The quota prioritization can be used to positively count towards the selection of the associated communication provider (e.g., if a system wants to meet a certain quota of messages) or alternatively negative impact selection (e.g., if a system wants to avoid going over a limit).

In some implementations, the relative properties for the associated communication providers are used to generate a communication provider priority list. In some implementations, the communication provider priority list is a customized list of communication providers prioritized for a particular communication request. Multiple communication provider are prioritized in order of preference. In some implementations, the listed communication providers may not have indicated preference and be a sub-set of the full set of communication providers.

In some implementations, an external system having an account at the communication platform 900 can configure communication profiles, which function to define communication providers and communication provider preferences for particular accounts and/or subsets of communication within an account of the communication platform 900.

In some implementations, communication providers, (e.g., OTT's) may be registered for a communication destination, and since most of the communication provider registration is achieved organically based on user activity, there will not be a uniform set of options across all communication destinations. Additionally, an external system (e.g., of a communication provider, such as, for example, an OTT provider) having an account at the communication platform 900 can configure a communication profile for its account at the platform 900 to allow communication originating from the external system to be terminated in particular communication provider services. For example social network A (having an account at the communication platform 900) may not want messages to automatically rerouted to social network B if social network A is not registered. In some implementations, a communication profile can exist for a particular communication provider. In some implementations, a communication profile identifies approved (or conversely prohibited) communication providers for communications relating to a particular communication provider. Additionally, the set of approved communication providers can be prioritized so that communication can default to the next highest priority if the first communication provider is not suitable for a particular communication. For example, an OTT communication provider may want the communication to first be completed using the OTT communication provider, but if that is not available an MMS communication provider is used, then an SMS communication provider, then finally a second selected OTT communication provider. In this example, a third OTT communication provider may not be part of the communication profile, and accordingly communication will not be terminated in the third OTT for the subset of communications related to the communication profile. In some implementations, the communication profile can specify different options for different forms of communication. For example, text messages may be defined to prioritize the communication providers in one manner, while media messages prioritize communication providers in a second manner. The communication profile can be set for each account of the communication platform 900. Preferably each OTT communication provider will have an OTT account within the communication platform 900, within which an administrator can set the communication profile. Additionally, non-OTT accounts at the communication platform 900 can set communication profiles to define how communications are routed.

Process S1030, which includes providing a request to establish communication with the communication destination to each selected communication provider, functions to control the communication platform 900 to provide the request to establish communication with each selected communication provider (e.g., the communication providers 931 and 932 of FIG. 9) in accordance with the communication request (e.g., the communication request 1099 of FIG. 10). In some implementations, each communication provider (e.g., the communication providers 931 and 932) receiving the request from the communication platform 900 establishes communication with at least one device (e.g., the devices 943 and 944) corresponding to the communication destination of the communication request (e.g., the communication request 1099 of FIG. 10). In some implementations, each communication provider (e.g., the communication providers 931 and 932) receiving the request from the communication platform 900 establishes communication with at least one device endpoint (e.g., the device endpoints 953 and 954) of a device (e.g., the devices 943 and 944) corresponding to the communication destination of the communication request.

In some implementations, the communication API module 911 of the communication system 910 of FIG. 9 receives the communication request from the external system, and the external system provides the communication request via an API request. In some implementations, the process S1010 is performed by the determination module 914 of the routing system 920. In some implementations, the process S1020 is performed by the selection module 915 of the routing system 920. In some implementations, the content converter 917 of the communication system 910 converts content of the communication request based on selection of the at least one communication provider at the process S1020. In some implementations, the content converter 917 of the communication system 910 converts content in a manner similar to that described above for the content converter 114 of FIG. 1.

6. Generating Routing Address Records

Figure 11A:
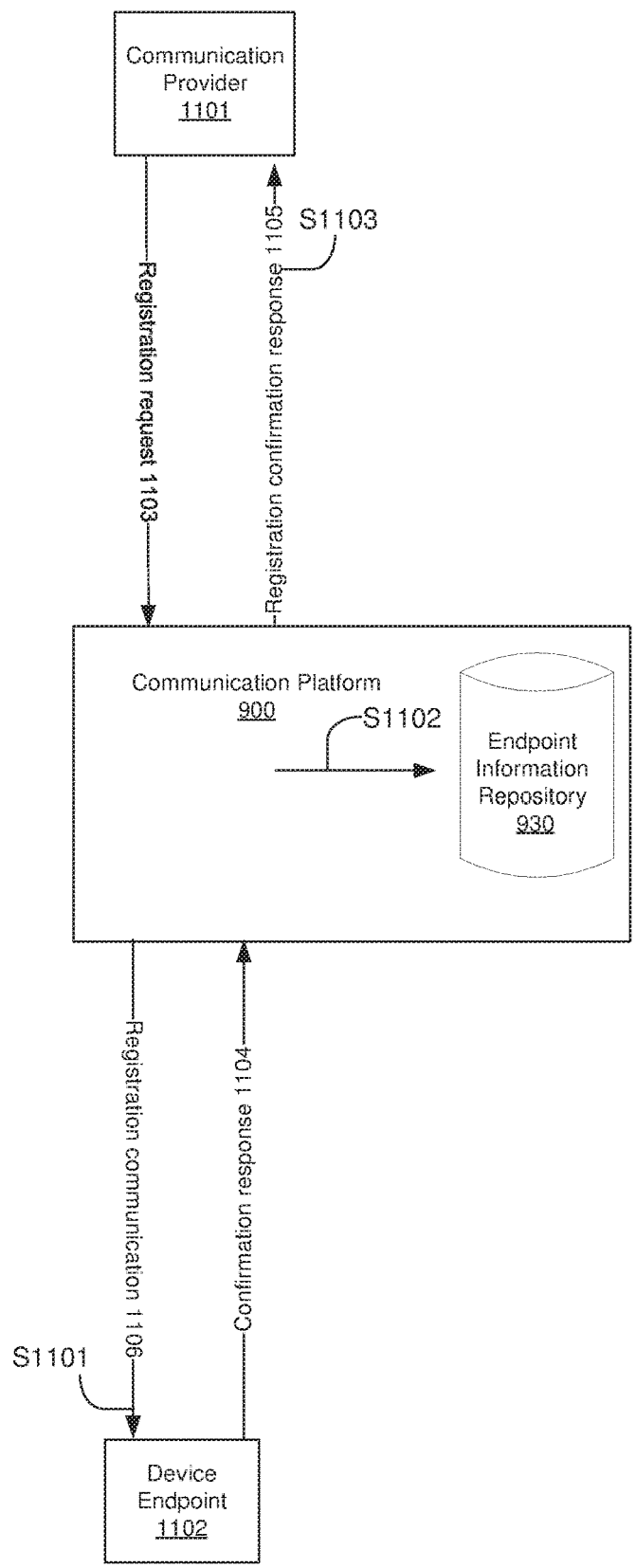
FIGS. 11A and 11B are chart views of a method of an embodiment.
Figure 11B:
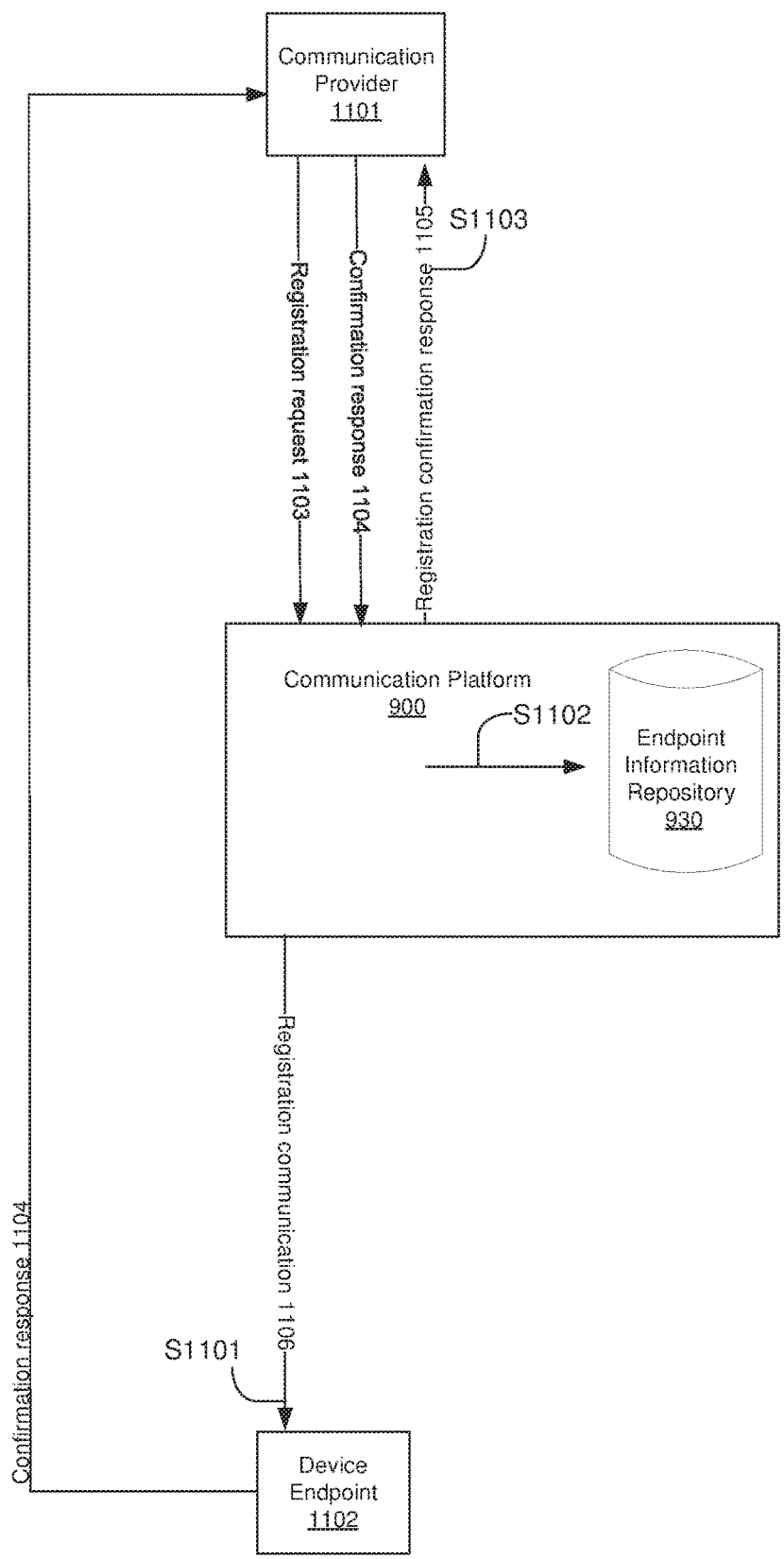

In some embodiments, the communication platform 900 generates each routing address record by, performing a process in accordance with FIGS. 11A and 11B. For each communication provider 1101 (e.g., the communication providers 931 and 932 of FIG. 9), the communication platform 900 transmits a registration communication 1106 to a device endpoint 1102 (e.g., the device endpoints 953-954 of FIG. 9) associated with the communication destination responsive to a registration request 1103 that identifies the communication provider 1101 and the device endpoint 1102 associated with the communication destination (process S1101).

In some implementations, the communication provider 1101 provides the registration request 1103 to the communication platform 900 by using the registration API module 912 of the endpoint information repository 930 of FIG. 9.

The communication platform 900 specifies the communication provider 1101 in the routing address record (stored by the endpoint information repository 930) in association with at least one of the communication destination and the corresponding device endpoint 1102 responsive to an endpoint conformation response 1104 provided by at least one of the device endpoint 1102 and the communication provider 1101 (process S1102). The communication platform 900 provides a registration confirmation response 1105 to the communication provider 1101 responsive to the endpoint confirmation response 1104 received by the communication platform 900 (process S1103). In the implementation shown in FIG. 11A, the device endpoint 1102 provides the endpoint conformation response 1104 to the communication platform 900. In the implementation shown in FIG. 11A, the device endpoint 1102 provides the endpoint conformation response 1104 to the communication provider 1101, and the communication provider 1101 provides the endpoint conformation response 1104 to the communication platform 900.

Thus, the communication platform 900 confirms a communication provider for each communication destination registered for the communication provider in accordance with the process described above for FIGS. 11A and 11B. In accordance with the process described above for FIGS. 11A and 11B, the communication platform 900 specifies the confirmed communication provider 1101 in the routing address record that corresponds to the registration request 1103 to register the communication provider 1101 for the communication destination.

In some implementations, responsive to the confirmation response (e.g., 1105) provided by the communication platform to the communication provider at the process S1103, the communication provider associates the communication destination with a user account of a user of the communication provider, and the communication provider stores the association at the communication provider.

The process of FIGS. 11A-11B functions to allow a communication provider to register and verify an endpoint (e.g., 1102) to associate with an account on the communication provider. The communication provider will preferably trigger the process of FIG. 11A or 11B when a user is registering for an account at the communication provider or pairing a new device to an account at the communication provider. After the new device endpoint 1102 is paired through the registration process, the communication platform 900 can use the communication provider 1101 as an additional communication provider available for establishing communication with the device endpoint 1102.

In some implementations, the registration request 1103 includes account information of an account of the communication platform 900. The account information can include authentication token(s), an account identifier, communication provider identifier, or any suitable source information. The communication provider 1101 will preferably initiate the registration API call when a customer attempts to pair a phone number or other communication endpoint with an account on the communication provider 1101. For example, within an account page on a communication provider 1101, a user can enter a phone number and submit the number. The communication provider 1101 will preferably send the API request to the communication platform 900 to complete the registration. From the user standpoint, the communication platform 900 is transparent. After submitting the phone number, the user will preferably receive a communication on his or her phone, which the user will be able confirm. The communication platform 900 can alternatively provide alternative interfaces to the communication providers. For example, an embeddable UI can be provided for facilitating registration user interface. The UI can be embedded in the communication provider 1101 website or application (e.g., as an iframe) to facilitate receiving registration.

In some implementations, the process S1101 functions to deliver a message or communicate with the device endpoint 1102. Preferably the communication platform 900 has at least one communication provider available for establishing communication with the device endpoint 1102. In implementations in which the device endpoint 1102 is a phone number, a SMS or MMS message can be delivered to the device endpoint 1102. Alternatively, an automated voice call can be delivered over PSTN, SIP, or an alternative VoIP communication protocol (e.g., WebRTC).

In some implementations, the registration communication 1106 includes a code or an alternative identifier. In some implementations, the registration communication 1106 includes a 6 digit pin that can be entered within an application, website, or any suitable interface. The entering of the pin codes signals successful delivery of the registration communication 1106 and that the owner of the device endpoint 1102 is confirming the registration. In some implementations, the registration communication 1106 includes a unique URI. When the delivered, the user can click the link to confirm the registration. Since the URI is unique, access of the resource can signal confirmation of the registration. Alternatively, the URI may display options to confirm or deny the registration. In some implementations, the registration communication 1106 is a message specifying response options. The message could be a text message, an image, a video, or any suitable media message. In some implementations, transmitting a registration communication 1106 includes making a voice or video call. The voice or video call can be used to receive confirmation or some form of a response during the call (e.g., through DTMF or voice recognition).

In some implementations, the process 1102 functions to determine the results of the registration with the device endpoint 1102. The confirmation response 1104 preferably includes confirmation of pairing the device endpoint 1102 with the communication provider 1101. The user will preferably be expecting the communication 1106 and will know that confirming will complete the process. In some implementations, the confirmation response 1104 is received from the device endpoint 1102 in response to the registration communication 1106. For example, the conformation response 1104 is an SMS or MMS message reply. The message reply can include a response such as "YES" or "NO" to indicate if the endpoint should or should not be registered in association with the request. The confirmation response 1104 may alternatively be made during the registration communication 1106 if the registration communication is a synchronous communication. In implementations in which a pincode is entered in an interface, the interface could be one created and provided by the communication provider 1101 or any suitable outside provider. An API call is preferably provided to inform the communication platform 900 of the user response. The communication provider (or outside provider) can use the API call to inform the communication platform 900 (e.g., as shown in FIG. 11B).

The registration process can additionally include verifying a device through an endpoint repository (e.g., the endpoint information repository 930 of FIG. 9), which functions to use existing endpoint information to add an additional layer in registration. The communication provider 1101 may not have access to information outside of their own platform, but the multi-modal communication aspect of the communication platform 900 can enable insights to be pulled from previous registrations and/or communications. The communication platform 900 will preferably retain information about various endpoints in the endpoint repository 930. In some cases an endpoint may already be registered with other communication providers or otherwise be known within the communication platform 900 due to prior communication interactions. The past history of a known endpoint can be used in confirming registration. In some implementations, automatic verification of a device endpoint (e.g., 1102) may be enabled if the endpoint is already confirmed through another communication provider. In some implementations, the verifying of the device may use fraud detection heuristics or other triggers to prevent confirmation of the registration.

In some implementations, the process S1102 functions to record the registration of an endpoint (e.g., 1102) with a new communication provider (e.g., 1101). The endpoint repository 930 will preferably include a set of records for different endpoints. Each endpoint record will preferably include a parameter or parameters that define the set of communication providers. The set of communication providers preferably include the communication providers that have registered with the endpoint. A communication provider registration can indicate that the user of the endpoint has paired an account of the communication provider with the phone. In some situations, this registration can be a signal that an application of the communication provider is used by the user or at least has been used by the user.

In some implementations, the endpoint repository 930 is used beyond registration but in facilitating and tracking communication through the communication provider. The endpoint repository 930 can be updated and maintained to signal different aspects of the endpoint and related communication providers. In some implementations, the endpoint repository 930 stores information relating to the history of each communication provider such as a registration timestamp, time of last communication through the communication provider on the communication platform 900, preference rating of an communication provider (e.g., order ranking of communication providers according to frequency of use). In some implementations, the endpoint repository 930 is used in synchronizing changes amongst communication providers. In some implementations, a change of registration of one communication provider may be applied to other communication provider registrations. For example, if a user gets a new phone number and updates the registration for a first communication provider, then the process may include notifying a second communication provider previously registered of the phone number change, automatically migrating the updated number for the second communication provider, invalidating the registration of the second communication provider until re-registered, and/or any suitable action.

In some implementations, the process S1103 functions to update the communication provider 1101 of the registration result. In some implementations, the signaling of the confirmation response includes a confirmation that the endpoint 1102 successfully completed registration or that the registration was not successfully confirmed. Unsuccessful confirmation may simply be a denial of registration, but the denial or error response may additionally include a reason such as cancelation (e.g., user changes his mind) or fraud reporting (e.g., user did not initiate the registration and flags the request). The signaling can be performed in a variety of approaches. In a first variation, the confirmation response 1105 is included in a response to the registration request API call 1103. In another variation, the confirmation response 1105 is posted or submitted to a specified resource of the communication provider 1101. In yet another variation, a resource in the communication platform 900 is updated, and the communication provider 1101 can poll the resource to obtain the status. For example, the registration request API call 1103 may trigger a response from the communication platform 900 that includes a resource identifier (e.g., a URI). The communication provider 1101 can poll the resource identifier until the confirmation response is obtained. Prior to receiving a confirmation response, the resource identifier can return a 'pending' response or an alternative response to indicate that the registration process is still in progress.

In some implementations, the registration process includes providing endpoint information of the endpoint repository 930, which functions to enable access, use, and interaction with the endpoint repository 930 (e.g., via the API module 912). Providing endpoint information preferably includes providing API access to at least a portion of the information of the endpoint repository 930. The API access preferably includes public API access that is usable by customers/users. The API access may alternatively or additionally be private used within the communication platform 900. In one variation, an API call can query a specific endpoint and retrieve information about communication provider registration with the endpoint. As discussed above, the usage relating to each communication provider may additionally be accessible. A portion of the API may be opened publically so that any entity can check if a particular endpoint is registered with a specific communication provider. In another variation, some or all the information may be limited to communication provider associated accounts in the communication platform 900. The communication provider can have a special account set up (e.g., the account used to submit the registration requests). In one variation, the communication provider can query all the phone numbers registered for the communication provider. After registration, a communication provider can additionally update registration such as canceling/terminating registration.

7. Method for a Multi-Tenant Communication Platform

A method for a multi-tenant communication platform (e.g., 900 of FIG. 9) in accordance with an example embodiment includes, at a multi-tenant communication platform (e.g., the platform 900 of FIG. 9): receiving a request (e.g., the communication request 1099 of FIG. 10) to establish communication, the request being provided by an external system (e.g., the external systems 921-923) and specifying a communication destination and an account identifier of the external system; determining whether the account identifier is a valid account identifier of an account that is permitted to establish communication by using the communication platform. Responsive to a determination that the account identifier is a valid account identifier of an account that is permitted to establish communication by using the communication platform: at least one communication provider (e.g., the communication providers 931 and 932) is determined for the communication destination based on an a routing address record (e.g., the routing address records 1081-1083 of FIG. 10) matching the communication destination. The matching routing address record associates the communication destination with one or more communication providers, and the routing address record is stored at the communication platform (e.g., in the endpoint information repository 930 of FIG. 9). Each communication provider (e.g., the providers 921-923) is external to the communication platform 900. One or more of the determined at least one communication provider is selected, and a request to establish communication with the communication destination is provided to each selected communication provider. The communication platform 900 generates the matching routing address record based on registration information (e.g., request 1103 and response 1104 of FIGS. 11A and 11B) provided to the communication platform for the communication destination by each determined communication provider. The communication destination matches at least one of a routing address identifier and a deterministic endpoint address specified in the matching routing address record.

In some embodiments, the methods disclosed herein are implemented in the multi-tenant communication platform 900 of FIG. 9. In some embodiments, the methods are implemented in any suitable type of multi-tenant communication platform.

8. System Architecture

Figure 12:
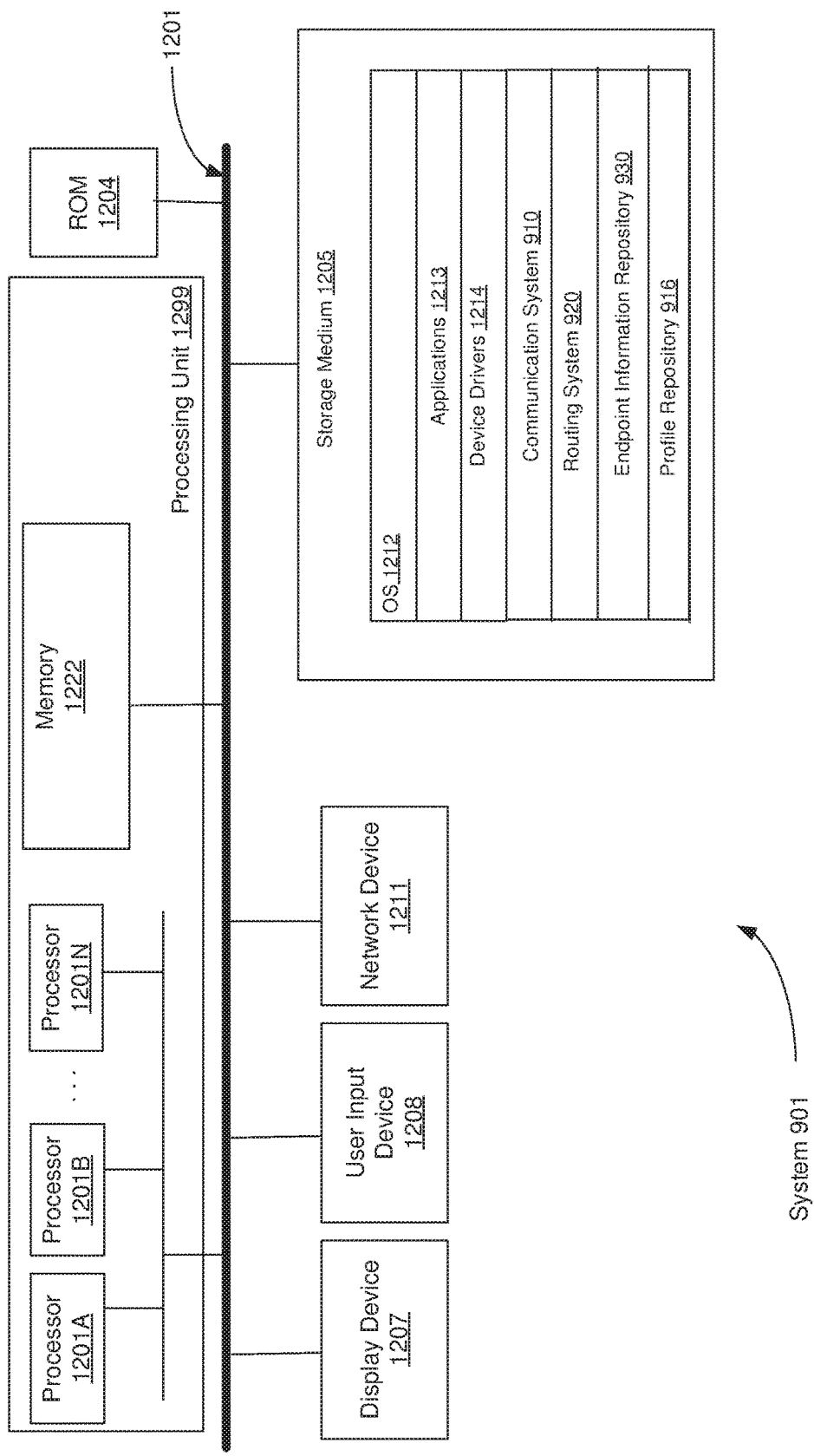
FIG. 12 is an architecture diagram of an embodiment.

FIG. 12 is an architecture diagram of a system (e.g., the system 901 of the communication platform 900 of FIG. 9) according to an implementation in which the system 901 is implemented in a server device. In some implementations, the communication system is implemented in a plurality of devices. In some implementations, the communication system 910, the routing system 920, the endpoint information repository 930, and the profile repository 916 are implemented in separate devices (e.g., server devices). In some implementations, two or more of the communication system 910, the routing system 920, the endpoint information repository 930, and the profile repository 916 are implemented in same devices (e.g., a server device).

The bus 1201 interfaces with the processors 1201A-1201N, the main memory (e.g., a random access memory (RAM)) 1222, a read only memory (ROM) 1204, a processor-readable storage medium 1205, a display device 1207, a user input device 1208, and a network device 1211.

The processors 1201A-1201N may take many forms, such as ARM processors, X86 processors, and the like.

In some implementations, the system 901 includes at least one of a central processing unit (processor) and a multi-processor unit (MPU).

The processors 1201A-1201N and the main memory 1222 form a processing unit 1299. In some embodiments, the processing unit includes one or more processors communicatively coupled to one or more of a RAM, ROM, and machine-readable storage medium; the one or more processors of the processing unit receive instructions stored by the one or more of a RAM, ROM, and machine-readable storage medium via a bus; and the one or more processors execute the received instructions. In some embodiments, the processing unit is an ASIC (Application-Specific Integrated Circuit). In some embodiments, the processing unit is a SoC (System-on-Chip). In some embodiments, the processing unit includes one or more of the communication system 910, the routing system 920, the endpoint information repository 930, and the profile repository 916.

The network adapter device 1211 provides one or more wired or wireless interfaces for exchanging data and commands between the system 901 and other devices, such as devices of the external systems 921-932, the communication providers 931 and 932, and the devices 943 and 944. Such wired and wireless interfaces include, for example, a universal serial bus (USB) interface, Bluetooth interface, Wi-Fi interface, Ethernet interface, near field communication (NFC) interface, and the like.

Machine-executable instructions in software programs (such as an operating system, application programs, and device drivers) are loaded into the memory 1222 (of the processing unit 1299) from the processor-readable storage medium 1205, the ROM 1204 or any other storage location. During execution of these software programs, the respective machine-executable instructions are accessed by at least one of processors 1201A-1201N (of the processing unit 1299) via the bus 1201, and then executed by at least one of processors 1201A-1201N. Data used by the software programs are also stored in the memory 1222, and such data is accessed by at least one of processors 1201A-1201N during execution of the machine-executable instructions of the software programs.

The processor-readable storage medium 1205 is one of (or a combination of two or more of) a hard drive, a flash drive, a DVD, a CD, an optical disk, a floppy disk, a flash storage, a solid state drive, a ROM, an EEPROM, an electronic circuit, a semiconductor memory device, and the like. The processor-readable storage medium 1205 includes an operating system 1212, software programs 1213, device drivers 1214, the communication system 910, the routing system 920, the endpoint information repository 930, and the profile repository 916.

CONCLUSION

The system and methods of the preferred embodiment and variations thereof can be embodied and/or implemented at least in part as a machine configured to receive a computer-readable medium storing computer-readable instructions. The instructions are preferably executed by computer-executable components preferably integrated with the communication system. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

What is claimed is:

1. A system comprising:
a multi-modal communication system comprising:
a network interface constructed to receive registration information for a communication destination from a plurality of communication providers external to the multi-modal communication system;
a routing address record repository constructed to store a first routing address record generated by the multi-modal communication system based on registration information for the communication destination received from the plurality of communication providers via the network interface; and
a communication application programming interface (API) module constructed to process communication API requests received from a first external system,
wherein responsive to receiving a first communication API request from the first external system via the communication API module, the first communication API request specifying the communication destination and account information, the multi-modal communication system is constructed to:
access a plurality of routing address records from the routing address repository,
select the first routing address record from the accessed plurality of routing addressed records based on a match between the communication destination of the first communication API request and at last one of a routing address identifier and a deterministic endpoint address specified in the first routing address record,
select at least one communication provider associated with the selected first routing address record,
provide a request to establish communication with the communication destination to each selected communication provider via the network interface.

2. The system of claim 1, wherein the communication API module is a REST API module.

3. The system of claim 1, wherein the first external system is an application server system that is communicatively coupled to the multi-modal communication system.

4. The system of claim 3, the system further comprising: the first external system.

5. The system of claim 1, wherein the first external system is one of a mobile device and a personal computing device that is communicatively coupled to the multi-modal communication system.

6. The system of claim 5, the system further comprising: the first external system.

7. The system of claim 1, wherein the system is a social network system, and wherein the first external system is a social network application server system that is communicatively coupled to the multi-modal communication system.

8. The system of claim 7, the system further comprising: the first external system.

9. The system of claim 1, wherein the system is a social network system, and wherein the first external system is a social network personal computing device that is communicatively coupled to the multi-modal communication system.

10. The system of claim 9, the system further comprising: the first external system.

11. The system of claim 1, wherein the system is a conferencing system, and wherein the first external system is a conferencing application server system that is communicatively coupled to the multi-modal communication system.

12. The system of claim 11, the system further comprising: the first external system.

13. The system of claim 1, wherein the system is a conferencing system, and wherein the first external system is a conferencing system personal computing device that is communicatively coupled to the multi-modal communication system.

14. The system of claim 13, the system further comprising: the first external system.

15. The system of claim 1, wherein the system is a gaming system, and wherein the first external system is a gaming application server system that is communicatively coupled to the multi-modal communication system.

16. The system of claim 15, the system further comprising: the first external system.

17. The system of claim 1, wherein the system is a gaming system, and wherein the first external system is a gaming system personal computing device that is communicatively coupled to the multi-modal communication system.

18. The system of claim 17, the system further comprising: the first external system.

19. The system of claim 1, wherein the system is a communication system, and wherein the first external system is a communication application server system that is communicatively coupled to the multi-modal communication system.

20. The system of claim 19, the system further comprising: the first external system.

* * * * *